United States Patent
Pattakos et al.

(10) Patent No.: US 9,695,739 B2
(45) Date of Patent: Jul. 4, 2017

(54) ASYMMETRIC TRANSFER AND INTAKE IN TWO-STROKES

(71) Applicants: Manousos Pattakos, Nikea Piraeus (GR); Efthimios Pattakos, Nikea Piraeus (GR); Paraskevi Pattakou, Nikea Piraeus (GR); Emmanouel Pattakos, Nikea Piraeus (GR)

(72) Inventors: Manousos Pattakos, Nikea Piraeus (GR); Efthimios Pattakos, Nikea Piraeus (GR); Paraskevi Pattakou, Nikea Piraeus (GR); Emmanouel Pattakos, Nikea Piraeus (GR)

( * ) Notice: Subject to any disclaimer, the term of this patent is extended or adjusted under 35 U.S.C. 154(b) by 234 days.

(21) Appl. No.: 14/715,597

(22) Filed: May 19, 2015

(65) Prior Publication Data

US 2015/0345372 A1    Dec. 3, 2015

(30) Foreign Application Priority Data

Jun. 3, 2014 (GB) .................................. 1409812.3
Jul. 3, 2014 (GB) .................................. 1411933.3

(51) Int. Cl.

| | |
|---|---|
| F02B 25/00 | (2006.01) |
| F02B 33/04 | (2006.01) |
| F02B 75/02 | (2006.01) |
| F02B 33/28 | (2006.01) |
| F02F 7/00 | (2006.01) |
| F16J 7/00 | (2006.01) |
| F02B 57/06 | (2006.01) |
| F02B 25/24 | (2006.01) |
| F02F 1/22 | (2006.01) |
| F02F 3/24 | (2006.01) |

(52) U.S. Cl.
CPC .............. *F02B 33/04* (2013.01); *F02B 33/28* (2013.01); *F02B 75/02* (2013.01); *F02F 7/0051* (2013.01); *F16J 7/00* (2013.01); *F02B 25/24* (2013.01); *F02B 57/06* (2013.01); *F02B 2075/025* (2013.01); *F02F 1/22* (2013.01); *F02F 3/24* (2013.01)

(58) Field of Classification Search
CPC .... F02B 2075/025; F02B 25/24; F02B 57/06; F02F 1/22
USPC ..................................................... 123/73 AA
See application file for complete search history.

(56) References Cited

U.S. PATENT DOCUMENTS 5,163,388 A * 11/1992 Jonsson .................. F02B 25/22
                                                                    123/65 BA

FOREIGN PATENT DOCUMENTS

| CH | EP 0390882 B1 * | 5/1996 | .............. F01B 9/026 |
| DE | 1576249 A1 * | 3/1970 | .............. F01L 11/02 |
| FR | 689089 A * | 9/1930 | .............. F01L 11/00 |

(Continued)

*Primary Examiner* — Hung Q Nguyen
*Assistant Examiner* — Charles Brauch

(57) ABSTRACT

With shaped connecting rod, piston and cylinder, an advantageous asymmetric timing of the two-stroke engine is achieved, wherein the combustion chamber communicates with the crankcase through a transfer port controlled by the piston and through a respective piston port controlled by the connecting rod, with the transfer port and its respective piston port arranged "in series", and wherein an intake port communicates with the crankcase through a piston port controlled by the connecting rod, with the intake port and its respective piston port arranged "in series".

19 Claims, 23 Drawing Sheets

(56) References Cited

FOREIGN PATENT DOCUMENTS

GB 2288637 A * 10/1995 .............. F01L 11/06

* cited by examiner

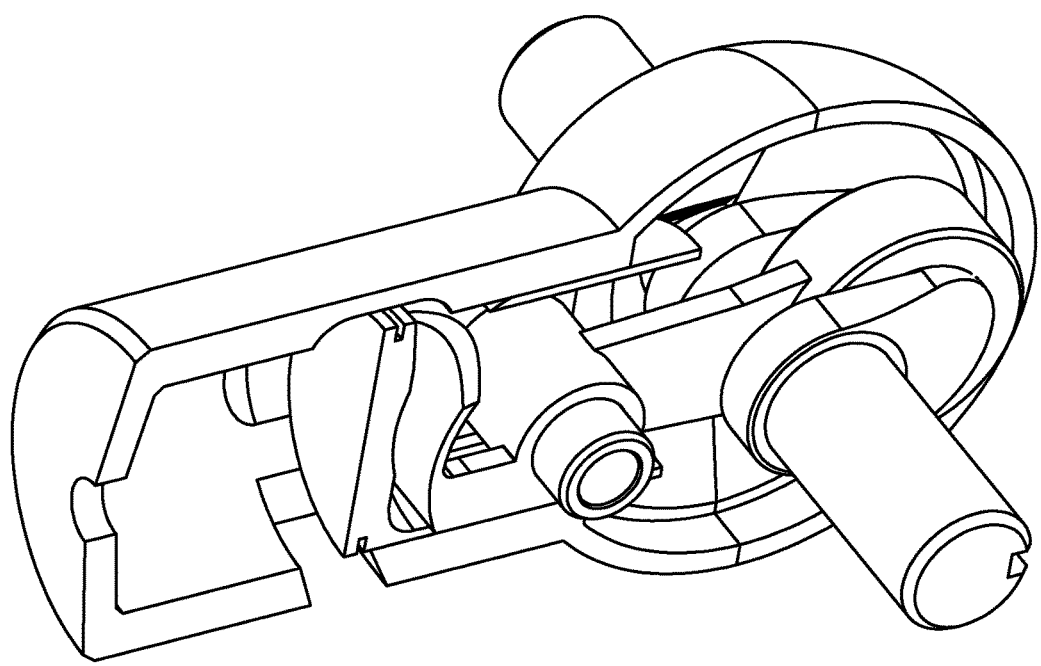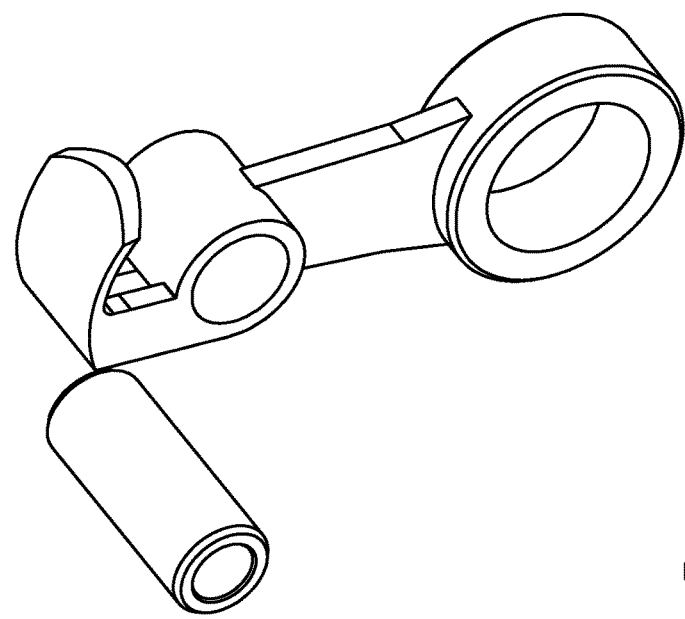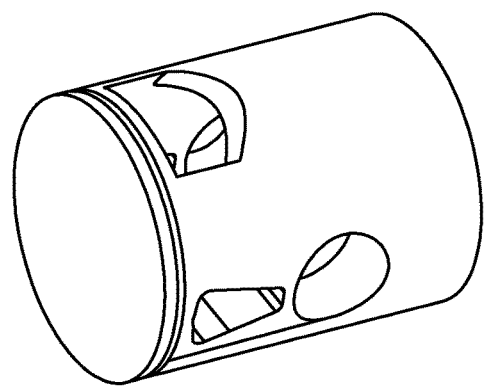
Fig 2

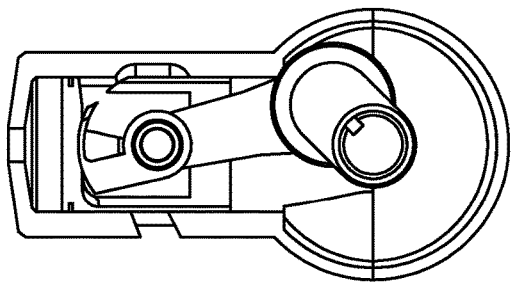
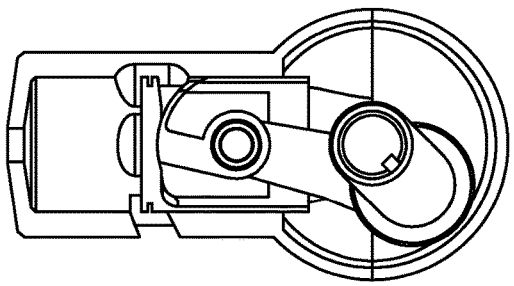
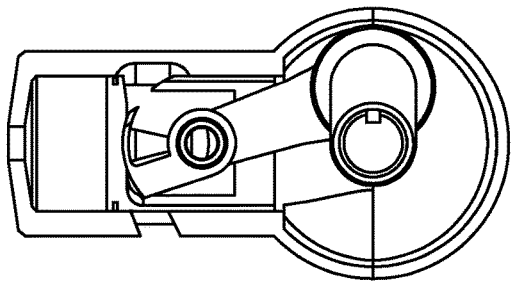
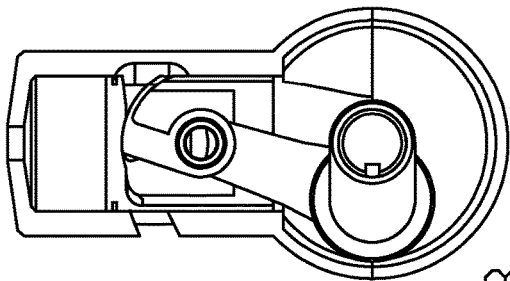
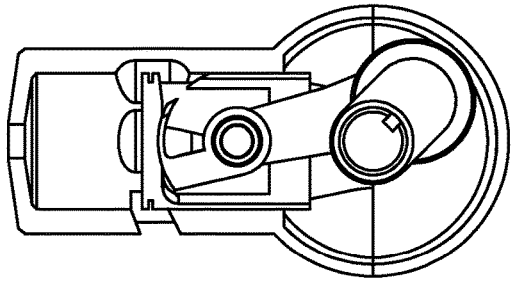
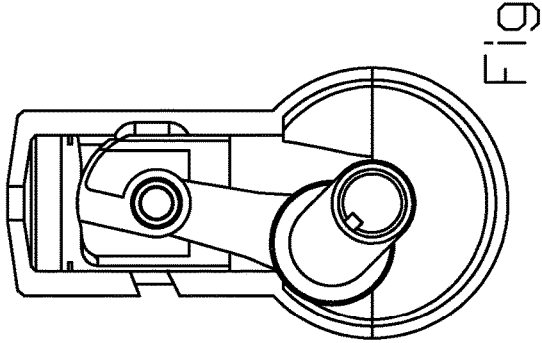
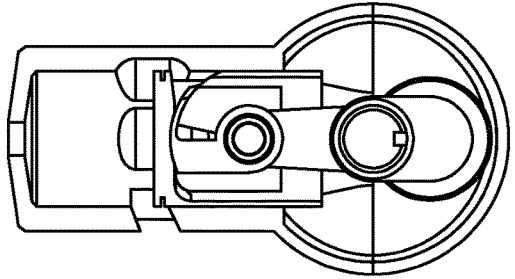
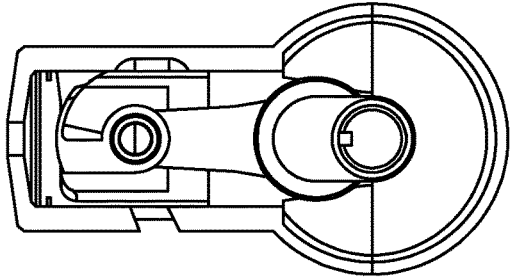
Fig 3

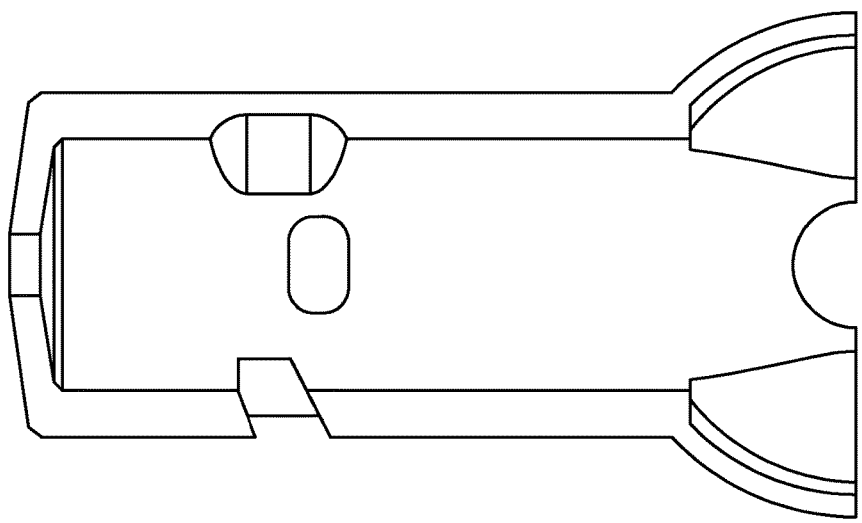
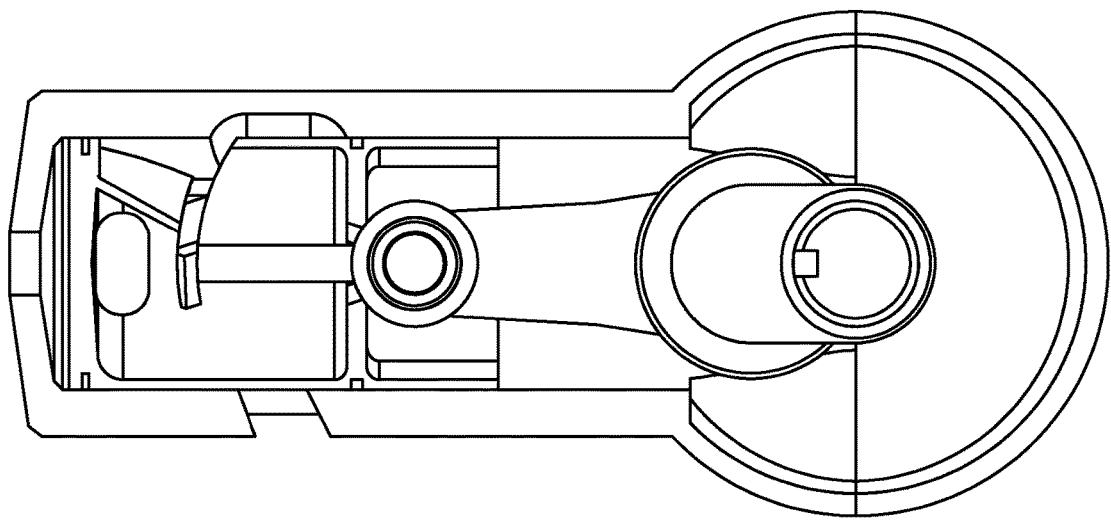
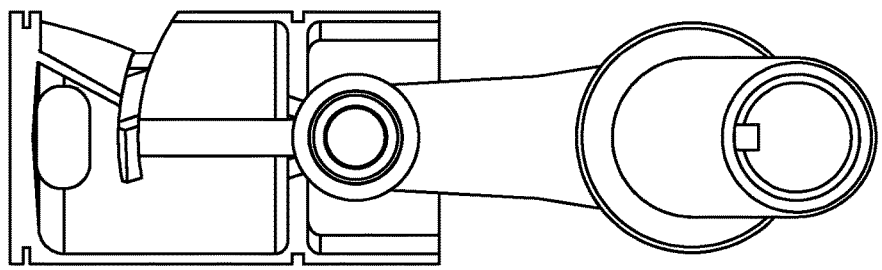
Fig 6

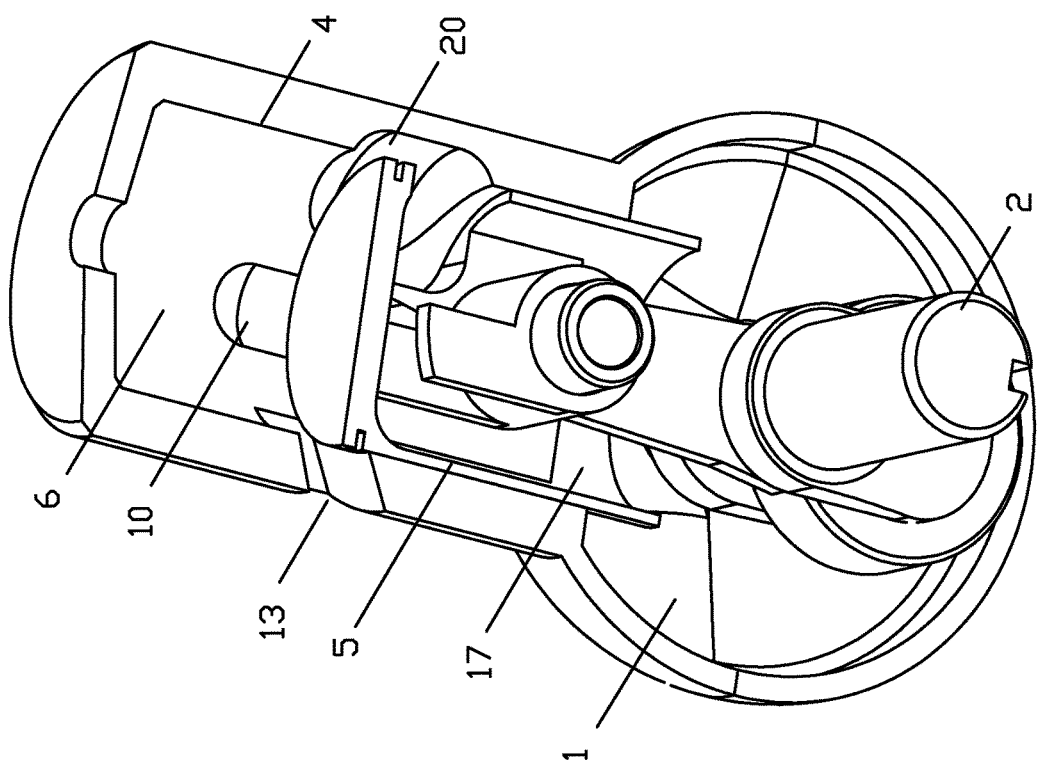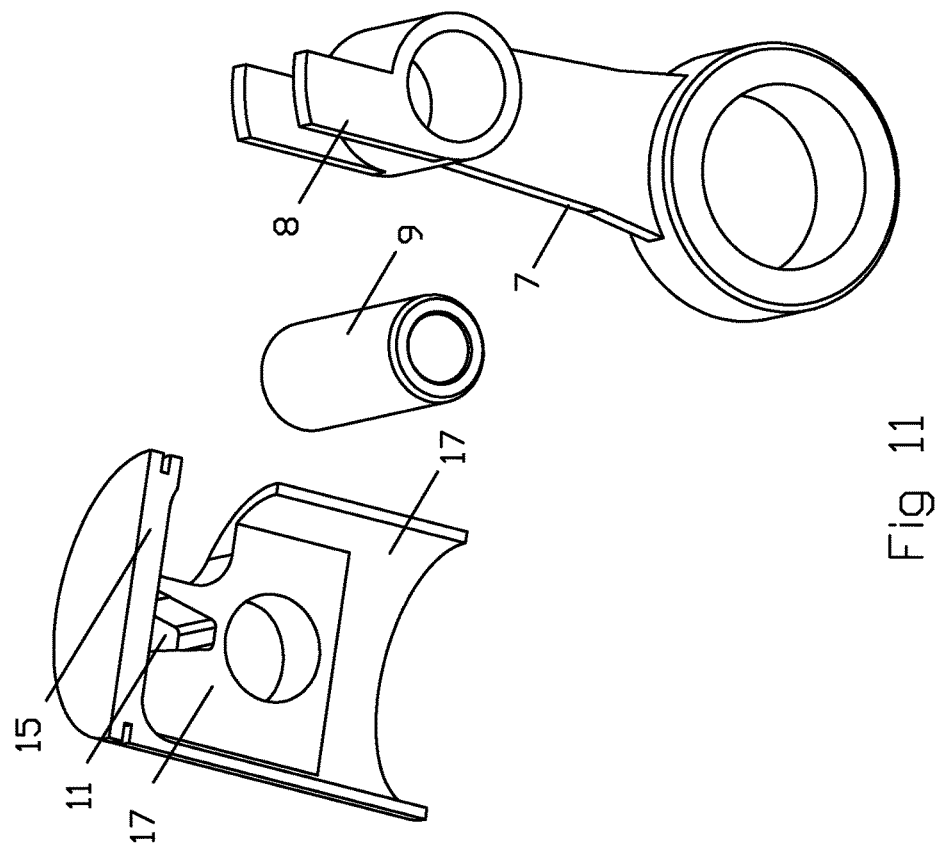
Fig 11

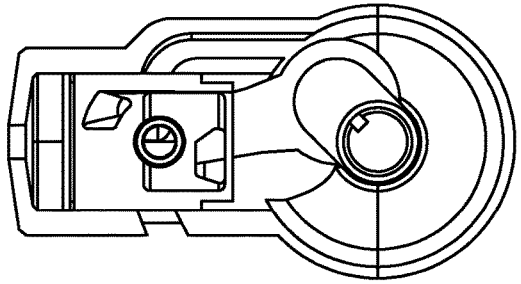
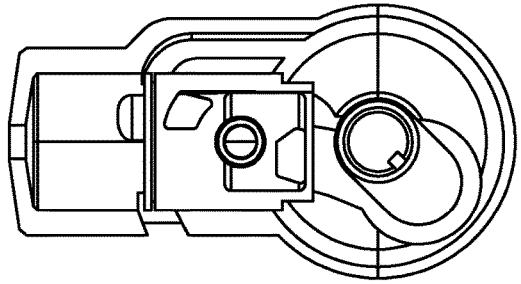
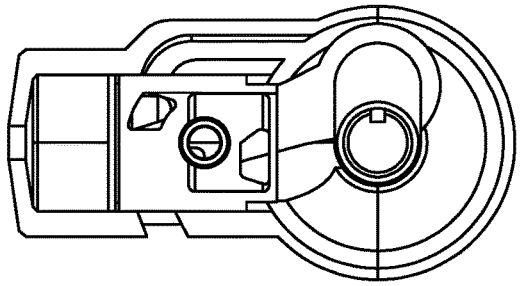
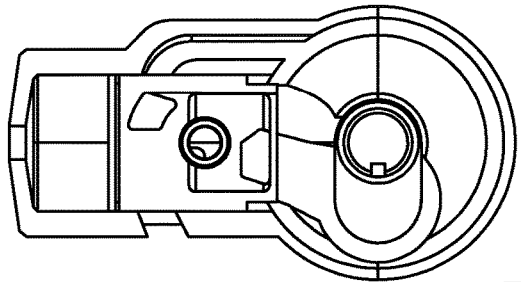
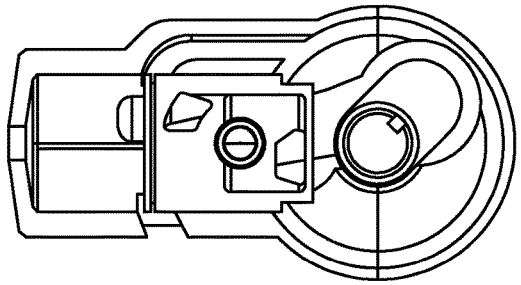
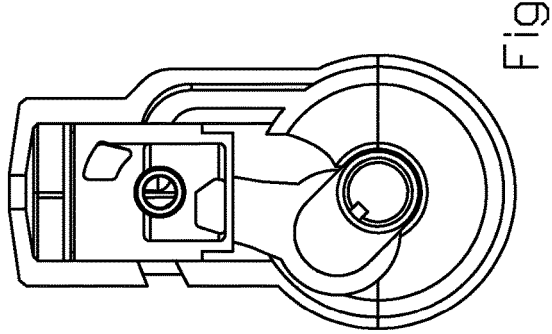
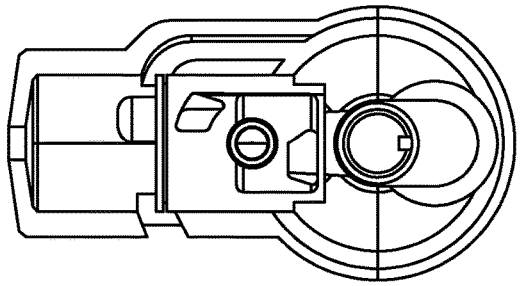
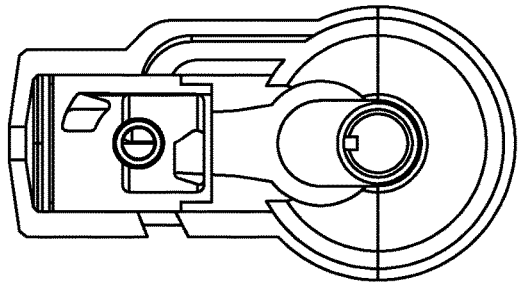
Fig 14

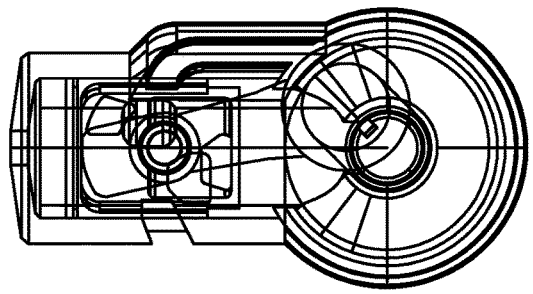
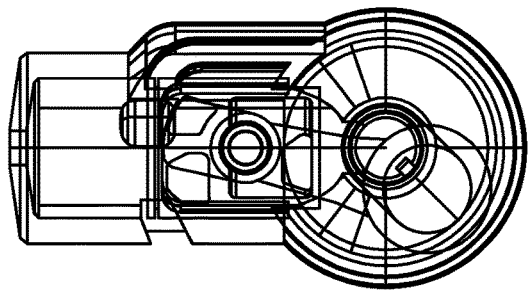
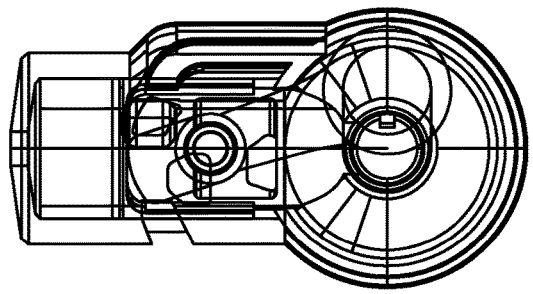
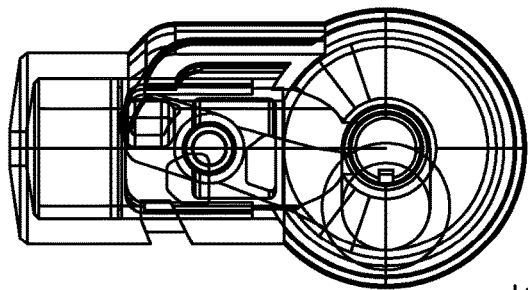
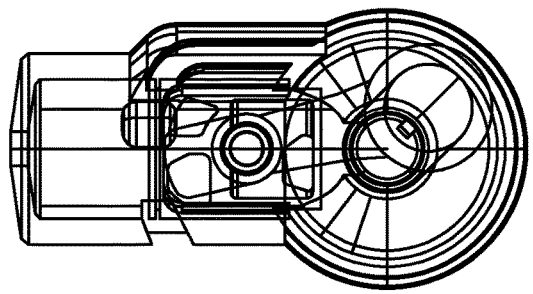
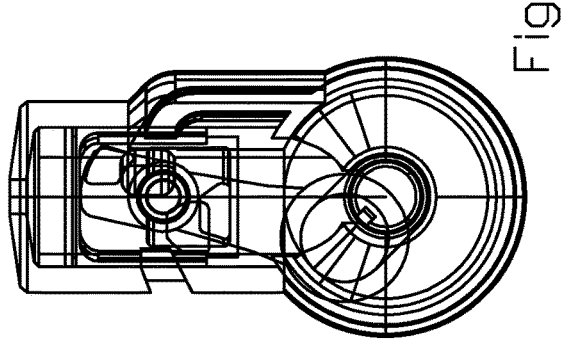
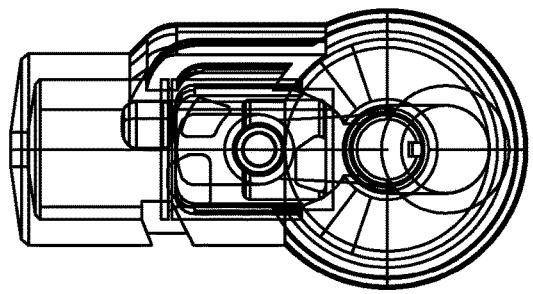
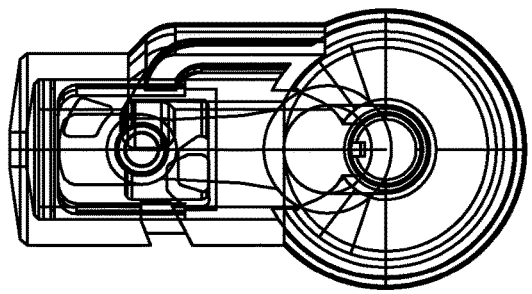
Fig 15

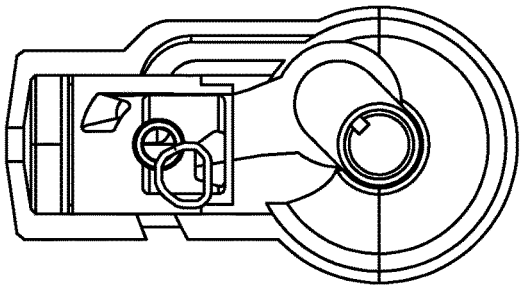
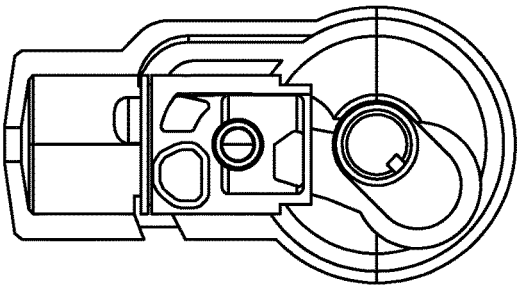
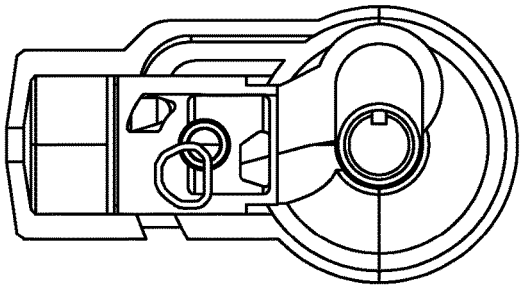
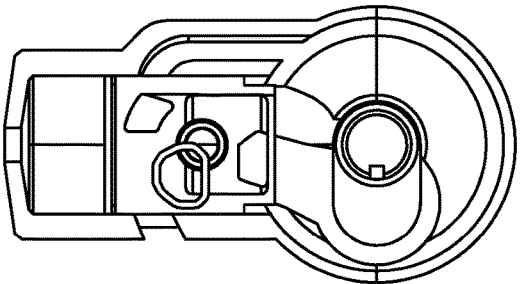
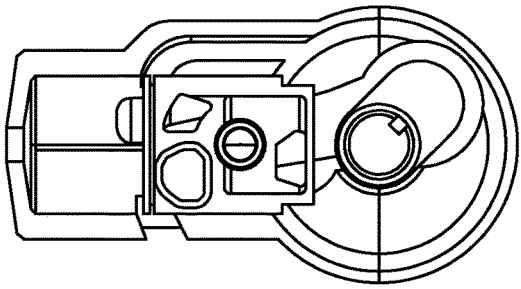
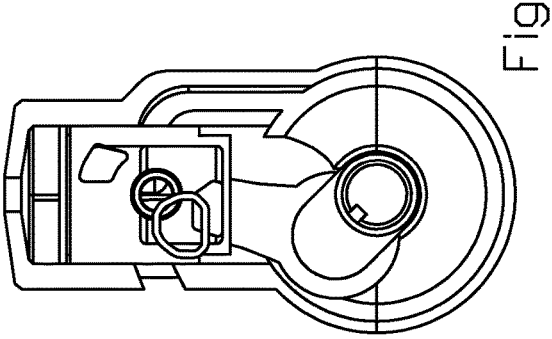
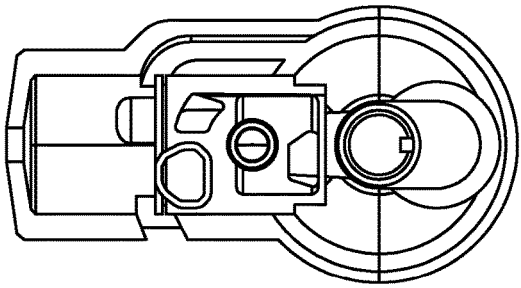
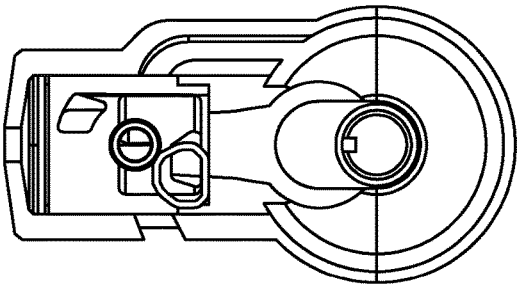
Fig 16

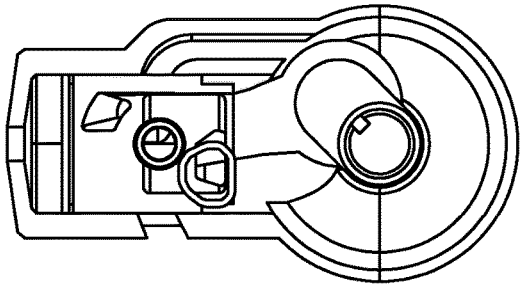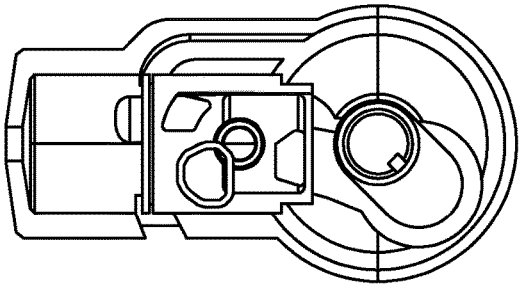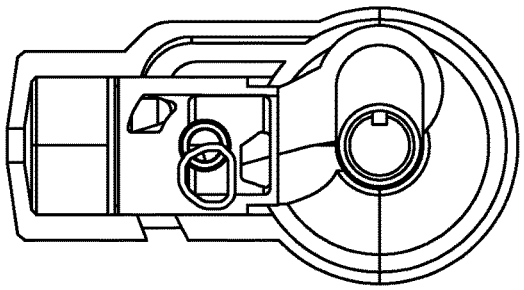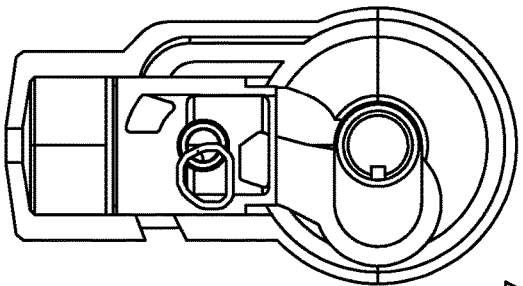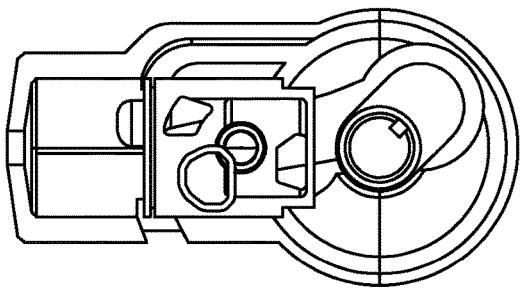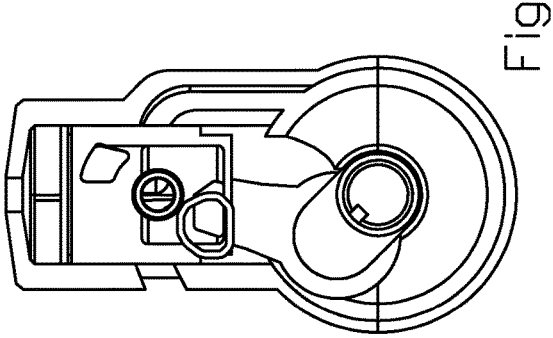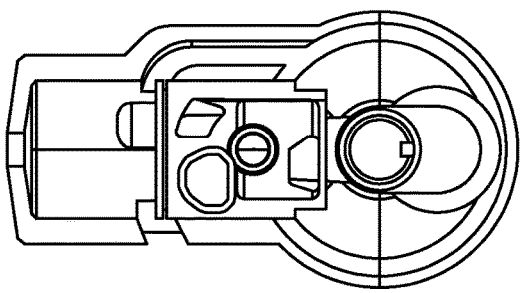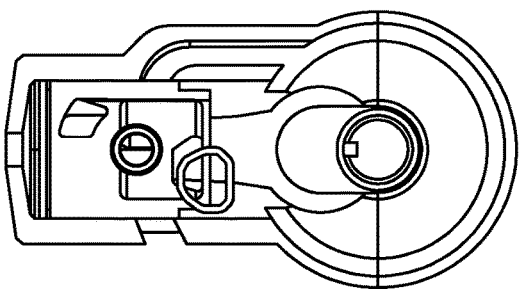
Fig 17

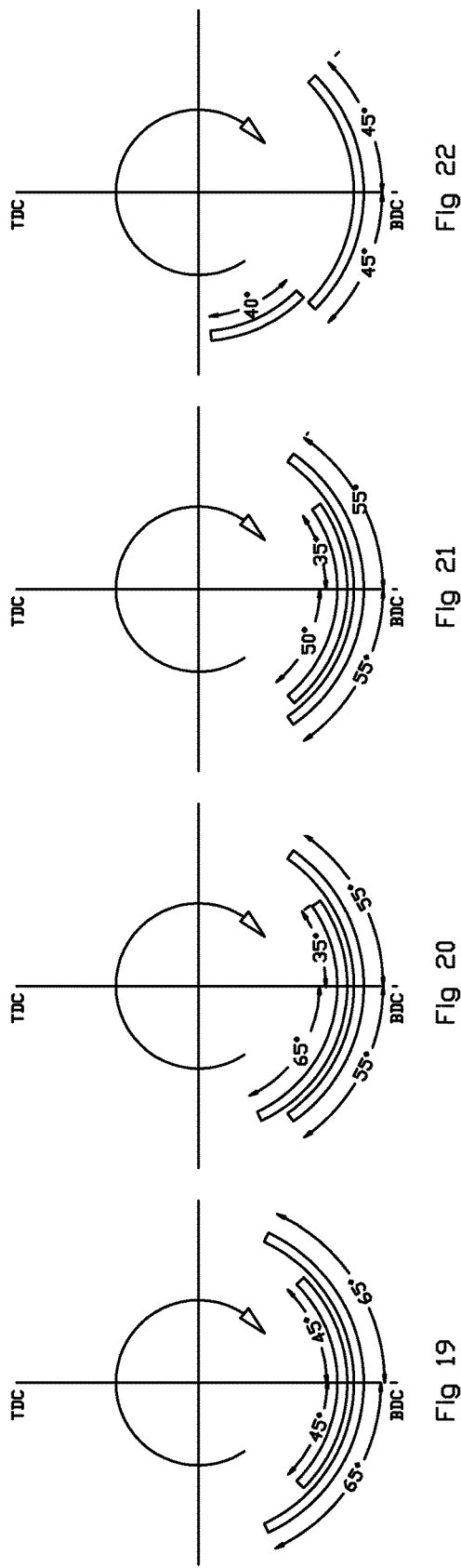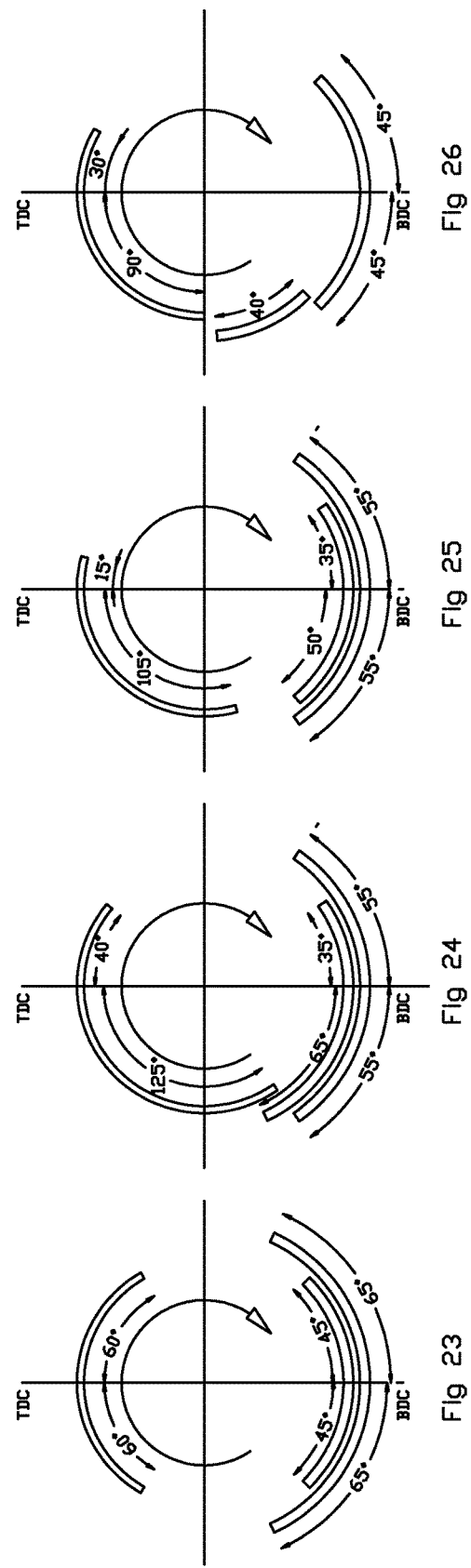

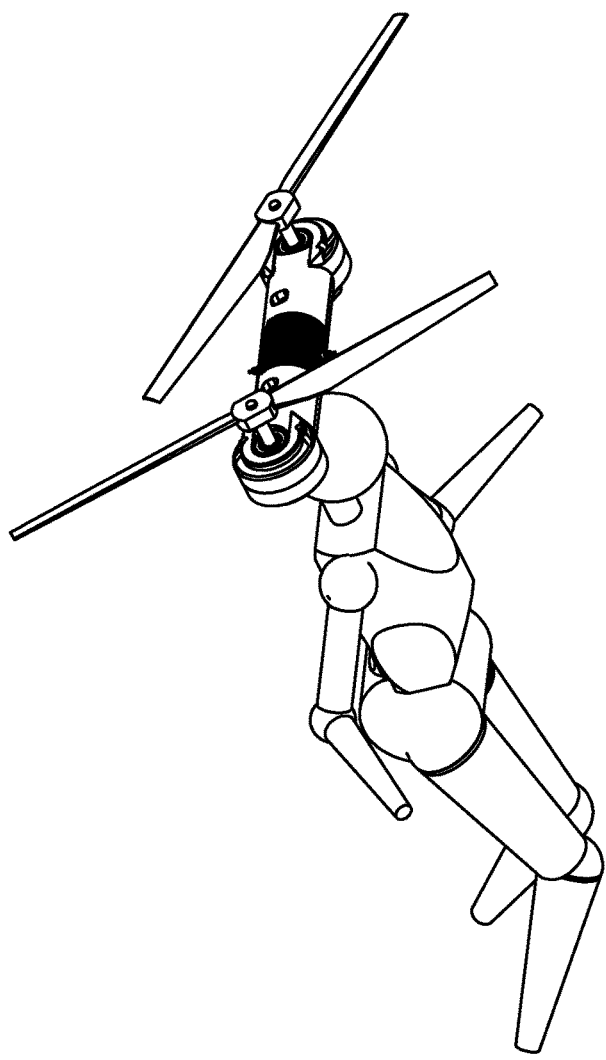
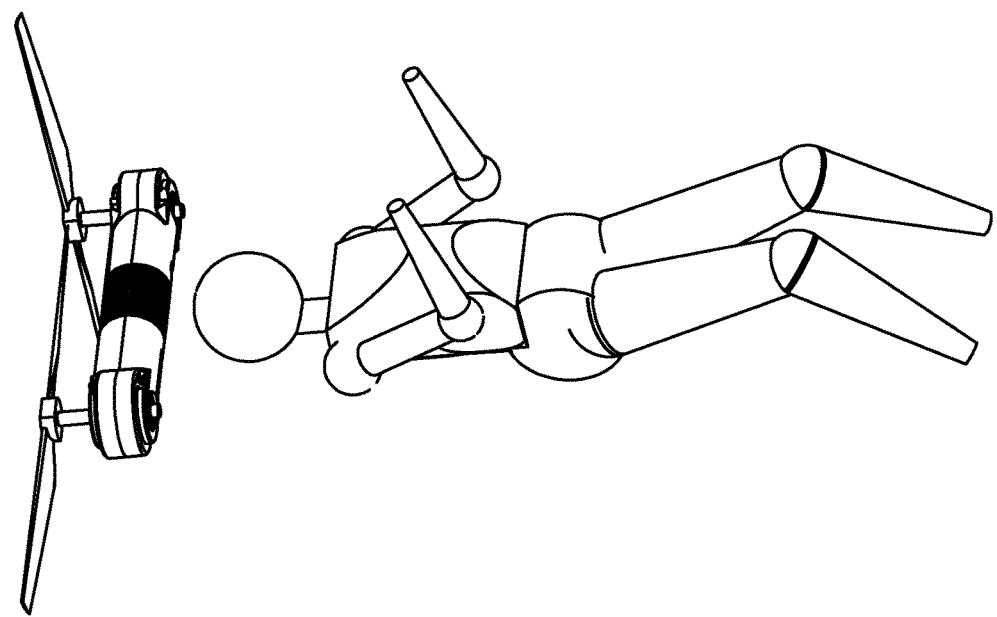
Fig 30

ASYMMETRIC TRANSFER AND INTAKE IN TWO-STROKES

FIELD OF THE INVENTION

With shaped connecting rod, piston and cylinder, an advantageous asymmetric timing of the conventional two-stroke engine is achieved.

BACKGROUND ART

The patent EP0390882B1 discloses a rocking square piston with integrally mounted connecting rod; its unconventional design enables the asymmetric timing of the ports: the exhaust port opens first while the transfer port closes last, which is crucial for the emissions, the efficiency, the power output etc.

The patent U.S. Pat. No. 5,163,388 discloses a two stroke wherein a valve selectively opens and closes a pipe connecting the source of pressurized air/mixture with a port on the cylinder liner located at a "higher lever" as compared to the exhaust port, allowing the effective asymmetric timing of the engine: after the closing of the exhaust by the piston, the introduction of air/mixture into the combustion chamber continues.

With a pair of pistons per combustion chamber (as in the opposed piston engines) the timing of the ports can be asymmetric, in expense of the added complication and vibrations.

The DE1,576,249A1 (of Anscheidt) discloses a two-stroke engine with asymmetric intake: an elastic strip (or band) secured, at one end, at the small end of the connecting rod, opens and closes an intake piston port that cooperates with an inlet port on the cylinder. As the piston reciprocates, the connecting rod pivots about the wrist pin and the elastic strip deforms following the shape of the inner piston surface wherein it abuts, covering and uncovering the intake piston port. This way the communication of the crankcase with the inlet port starts early in the compression stroke (for instance 120 degrees before the TDC) and ends early in the expansion stroke (for instance 40 degrees after the TDC), being substantially asymmetric.

The PCT/GB95/02952 (of Keith Charles Sugden) claims "a piston with internal compartments characterized by being segregated with a partition which also forms the matting surface for the lower bearing of the connecting rod little-end which has not gudgeon pin and is housed inside the uppermost compartment in such shape and configuration that arc sliding of said bearing forms a gate-valve using said partition's one or more ports to permit air from the compartment fed from a pressurized air input to flow at designated crank positions through the open gate-valve into another compartment and from there into a transfer passage which then conducts the air through the cylinder wall appreciably above the exhaust port's opening level so that the combination of piston plus gate-valve motion subjects the cylinder plus transfer passage interiors to a repetitive fixed sequence of operational modes".

The GB2,288,637 (of Keith Charles Sugden) claims "a cylinder with a piston slidably sealed in the cylinder, the cylinder including at least one transfer port and at least one exhaust port, with the said transfer port being connected into intermittent communication with the inlet manifold via a moving gate valve within the piston, the said valve operated and controlled by the relative arc motion occurring between the said piston and the constraining connecting rod".

In the FR689,089 (of Mijnlieff) the top end of an unconventional connecting rod pivots on the piston crown and seals one side of the combustion chamber; the pivotal motion of the connecting rod relative to the piston enables a substantially asymmetric transfer and exhaust; sealing means (similar to the piston rings) are required between the piston and the connecting rod.

SUMMARY OF THE INVENTION

Among the objects of the present invention is to give to the ported two-stroke engines an efficient, low cost, simple and reliable asymmetric timing of the intake and transfer events.

BRIEF DESCRIPTION OF THE SEVERAL VIEWS OF THE DRAWINGS

FIG. 2 shows the first embodiment from another viewpoint.
FIG. 3 shows the first embodiment at some angles of the crankshaft (per 45 crank degrees).
FIG. 6 shows a second embodiment.
FIG. 11 shows the third embodiment from another viewpoint.
FIG. 14 shows the fourth embodiment at various crank angles.
FIG. 15 shows what FIG. 14 with the parts "transparent".
FIG. 16 shows what FIG. 14 with the addition of a section of the intake port.
FIG. 17 shows what FIG. 16; the difference is that the inlet port 21 is arranged "lower".
FIG. 19 shows the exhaust and transfer timing of a conventional two stroke.
FIG. 20 shows the exhaust and transfer timing of a two stroke made according this invention.
FIG. 21 shows another possible exhaust and transfer timing of a two stroke made according this invention.
FIG. 22 shows another possible exhaust and transfer timing of a two stroke made according this invention.
FIG. 23 shows the exhaust, the transfer and the intake timing of a conventional two stroke that controls the intake by the piston.
FIG. 24 shows the exhaust, the transfer and the intake timing of a two stroke made according the preferred embodiment of this invention.
FIG. 25 shows another possible "exhaust, transfer and intake" timing of a two stroke made according the fourth embodiment of this invention.

FIG. 26 shows another possible timing scheme of a two-stroke engine made according the fourth embodiment.

FIG. 30 shows a Portable Flyer based on the engine of FIG. 28.

DETAILED DESCRIPTION

Figure 1:
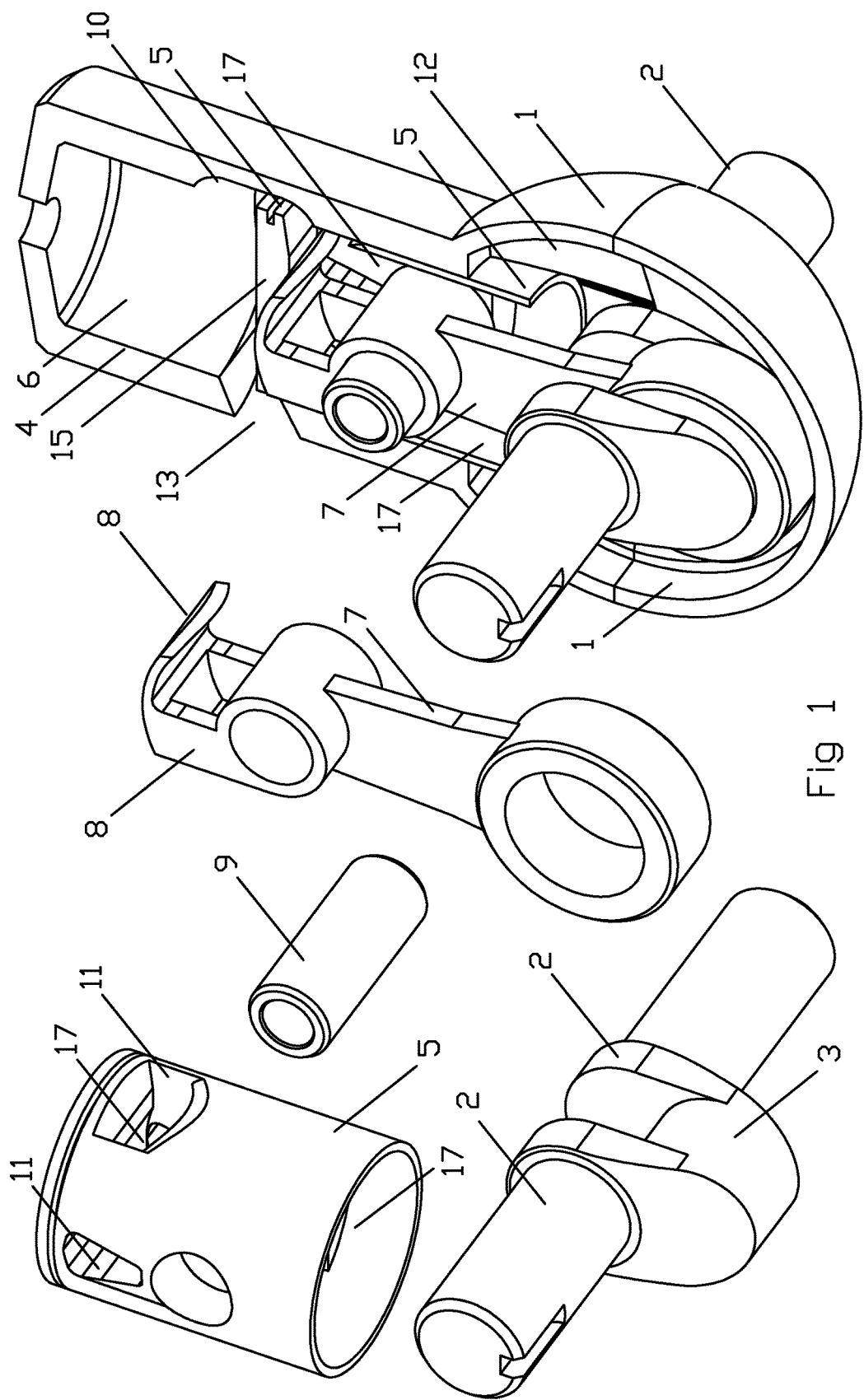
FIG. 1 shows a first embodiment.

FIG. 1 shows a first embodiment. At top left is the piston having ports on it; at bottom left is the crankshaft; the connecting rod is at the middle and has, at the wrist pin side, extensions comprising plane, cylindrical etc transfer control surfaces 8 that close and open transfer control ports 11 of the piston; at right it is the engine assembled, with the casing and the piston sliced. Before the opening of the exhaust port 13, the space 17 within the piston is not communicating with the transfer port 10 and the combustion chamber 6, so that near the end of the expansion the high pressure, and hot, gas inside the combustion chamber has not the chance to expand into the piston, avoiding several problems (piston overheating, increased fuel consumption, more emissions). The two transfer control surfaces at the sides of the connecting rod (the one side is towards the one end of the wrist pin, the other side is towards the other end of the wrist pin) allow the reduction/elimination of the side loads on the connecting rod after the opening of the transfer port 10 near the end of the expansion and before the opening of the exhaust port 13 (and consequently the reduction/elimination of the thrust between the cooperating surfaces on the connecting rod and on the piston which provide the sealing of the space within the piston 17 from the transfer port 10).

FIG. 2 shows what FIG. 1 from another viewpoint.

FIG. 3 shows the first embodiment at eight different angles of the crankshaft (per 45 crank degrees). The casing and the piston are sliced to show more details.

Figure 4:
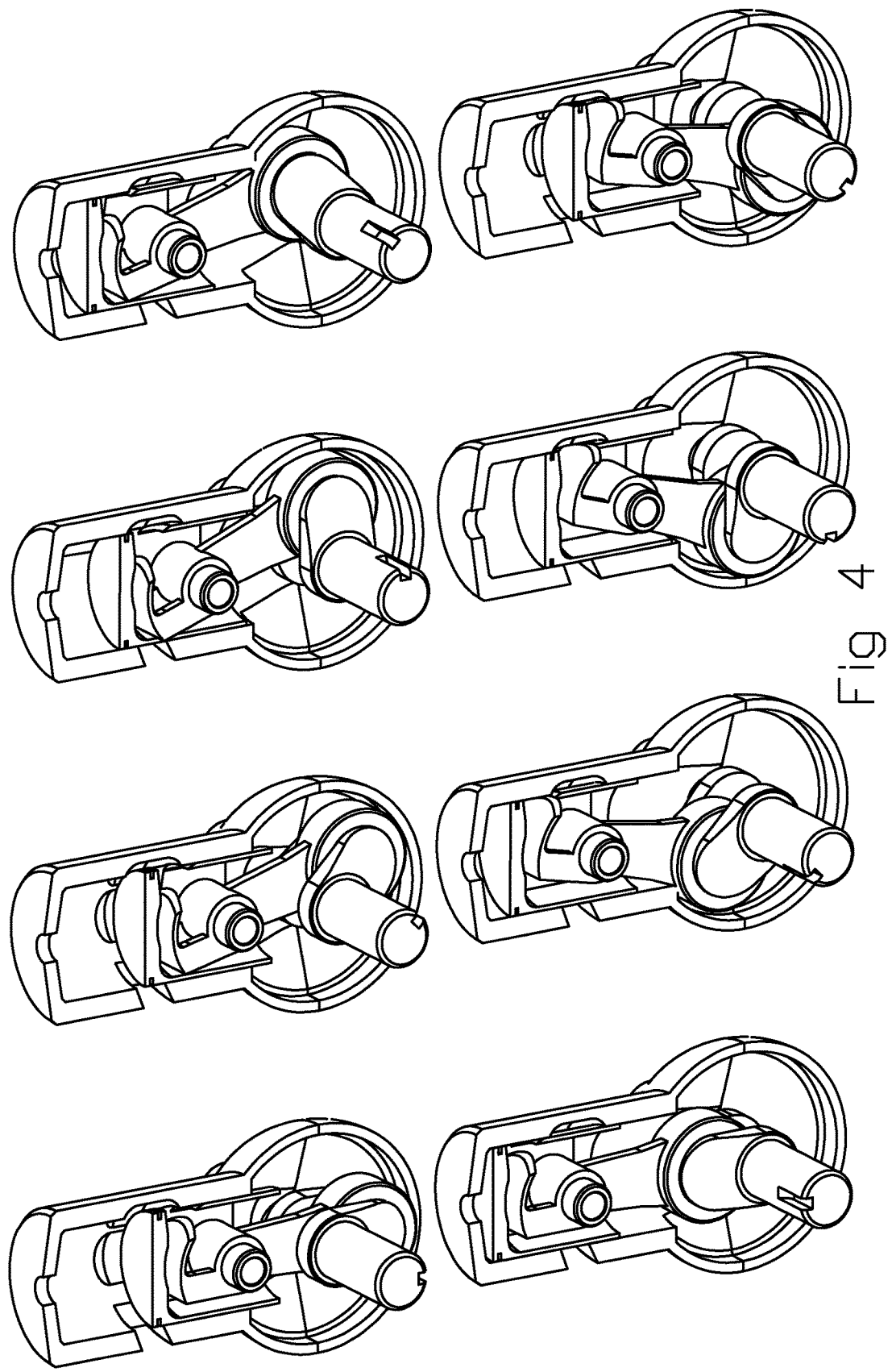
FIG. 4 shows the first embodiment at some angles of the crankshaft from a different viewpoint.

FIG. 4 shows what FIG. 3 from another viewpoint.

Figure 5:
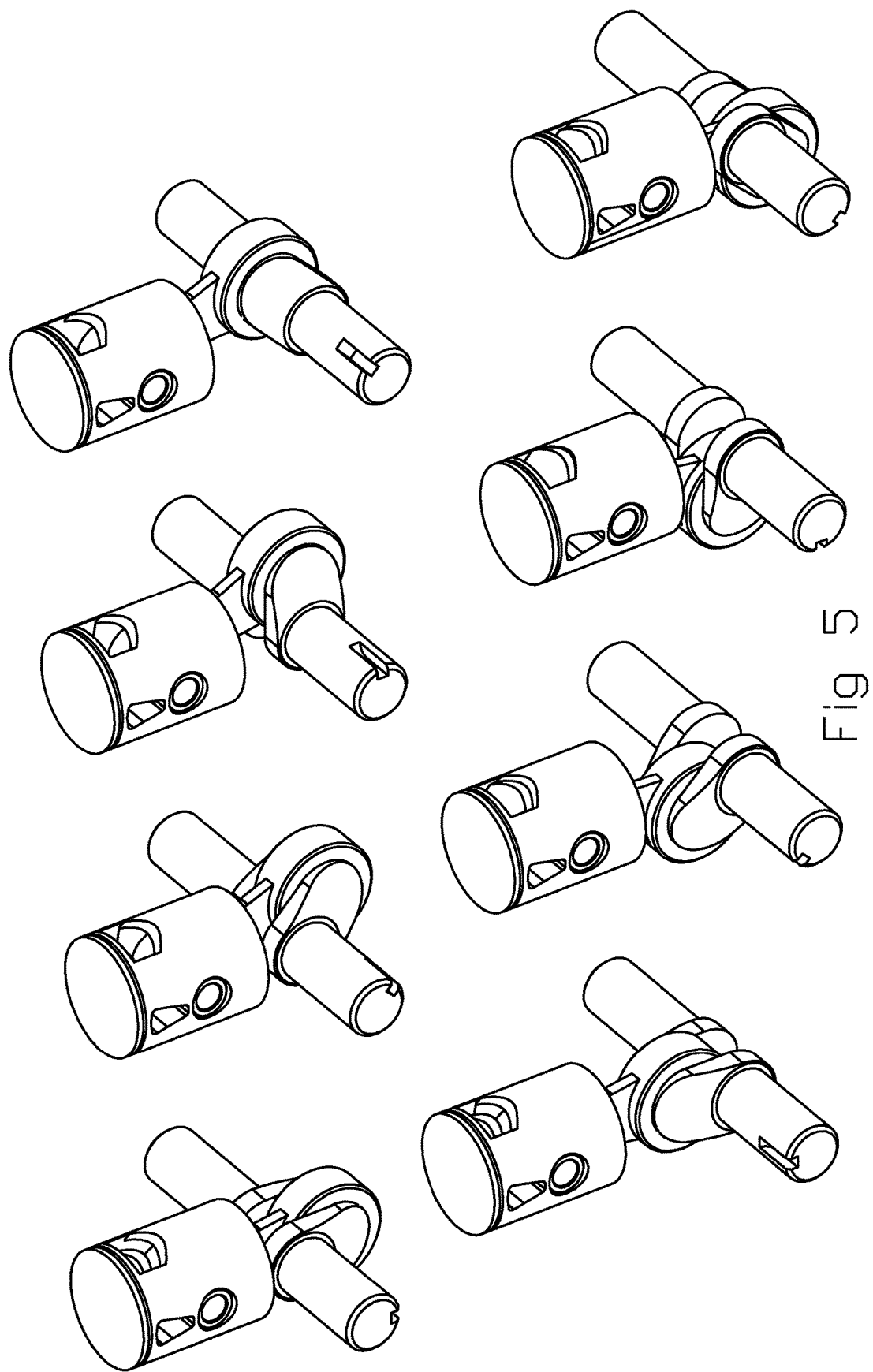
FIG. 5 shows only the moving parts of the first embodiment per 45 crankshaft degrees.

FIG. 5 shows only the moving parts of the first embodiment per 45 crankshaft degrees. From the big piston port, at right, it is shown the connecting rod extension that opens and closes this transfer control port.

FIG. 6 shows a second embodiment. The casing is shown at right, sliced, with the opening at left being the exhaust port, with the port at right being the transfer port and with the hole between them being for the communication with an external source of pressurized air or mixture (not shown). The piston comprises a pressure ring groove at top, and an oil scraper ring groove at middle. A plate in the piston is separating a space within the piston, underneath the piston crown, from the crankcase. Depending on the crankshaft rotation angle, the extension of the connecting rod allows or stops the communication of the space within the piston with the transfer port and the combustion chamber.

Figure 7:
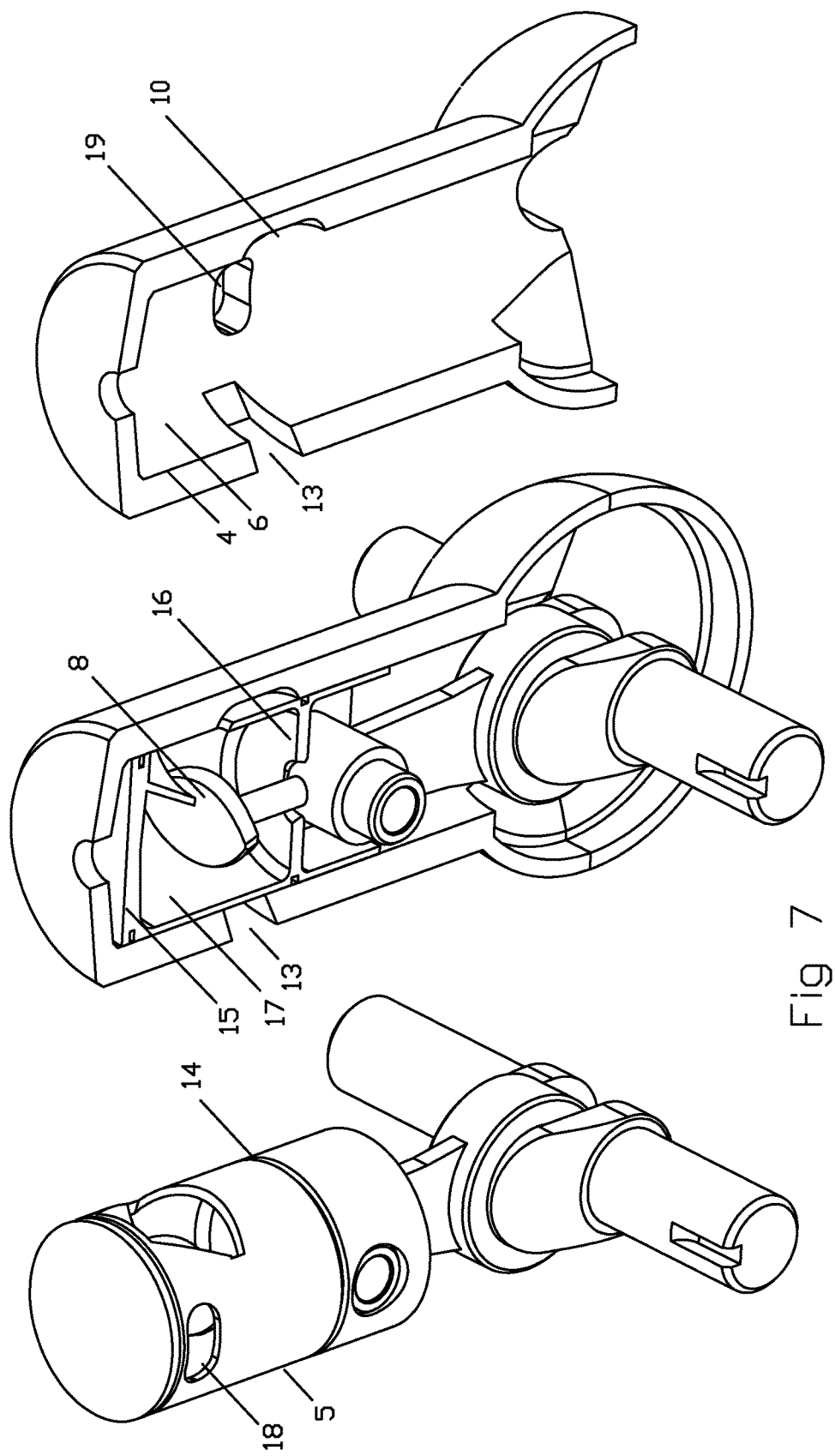
FIG. 7 shows the second embodiment from another viewpoint.

FIG. 7 shows what FIG. 6 from another viewpoint. The piston is shown complete at left: the big piston port at right is for the communication of the space within the piston with the transfer port, the openings at the sides (above the wrist pin and below the compression ring groove) are for the communication with an external source of pressurized air or mixture.

Figure 8:
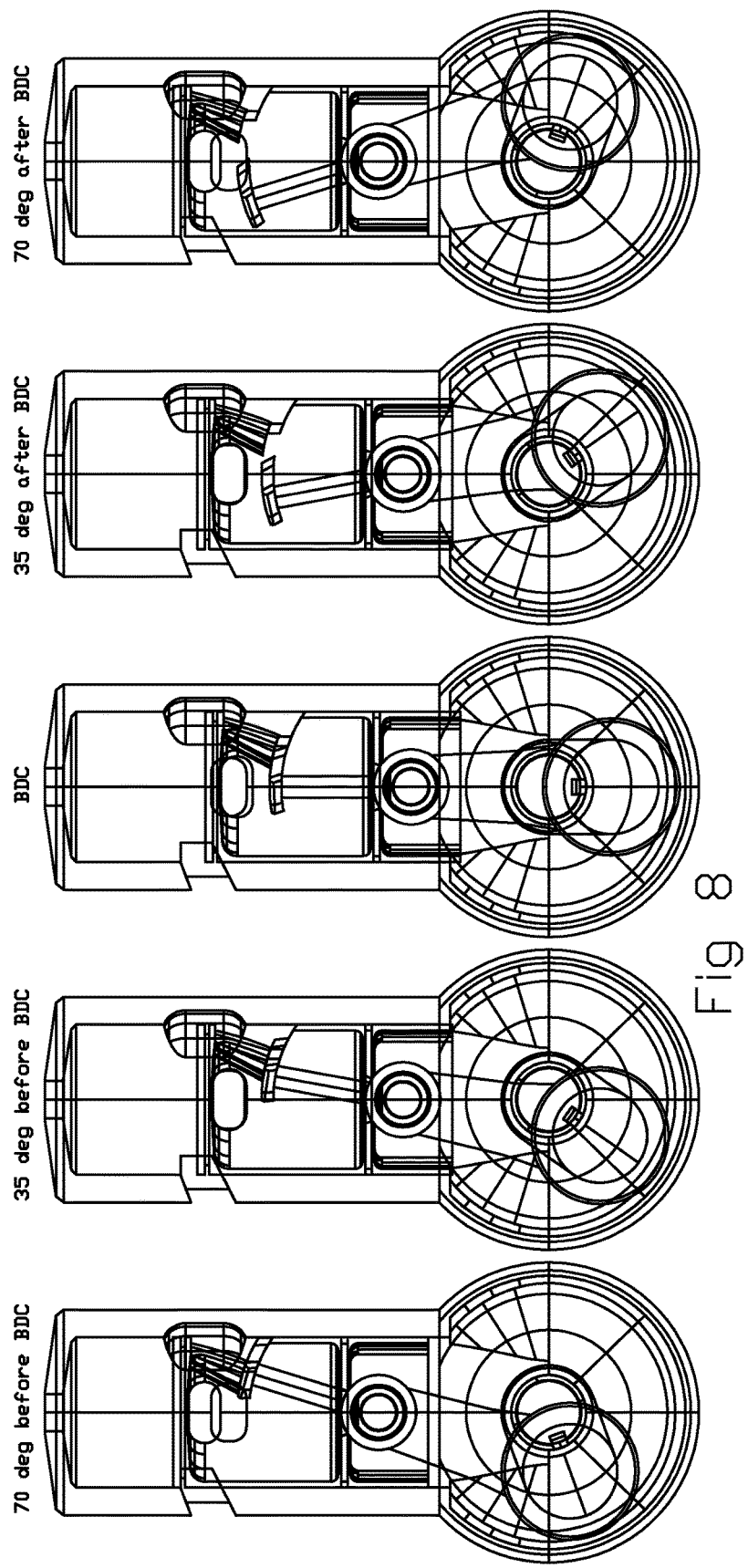
FIG. 8 shows the second embodiment at various crankshaft angles; the parts are shown transparent.

FIG. 8 shows the second embodiment at five crankshaft angles (the parts are shown transparent).

Figure 9:
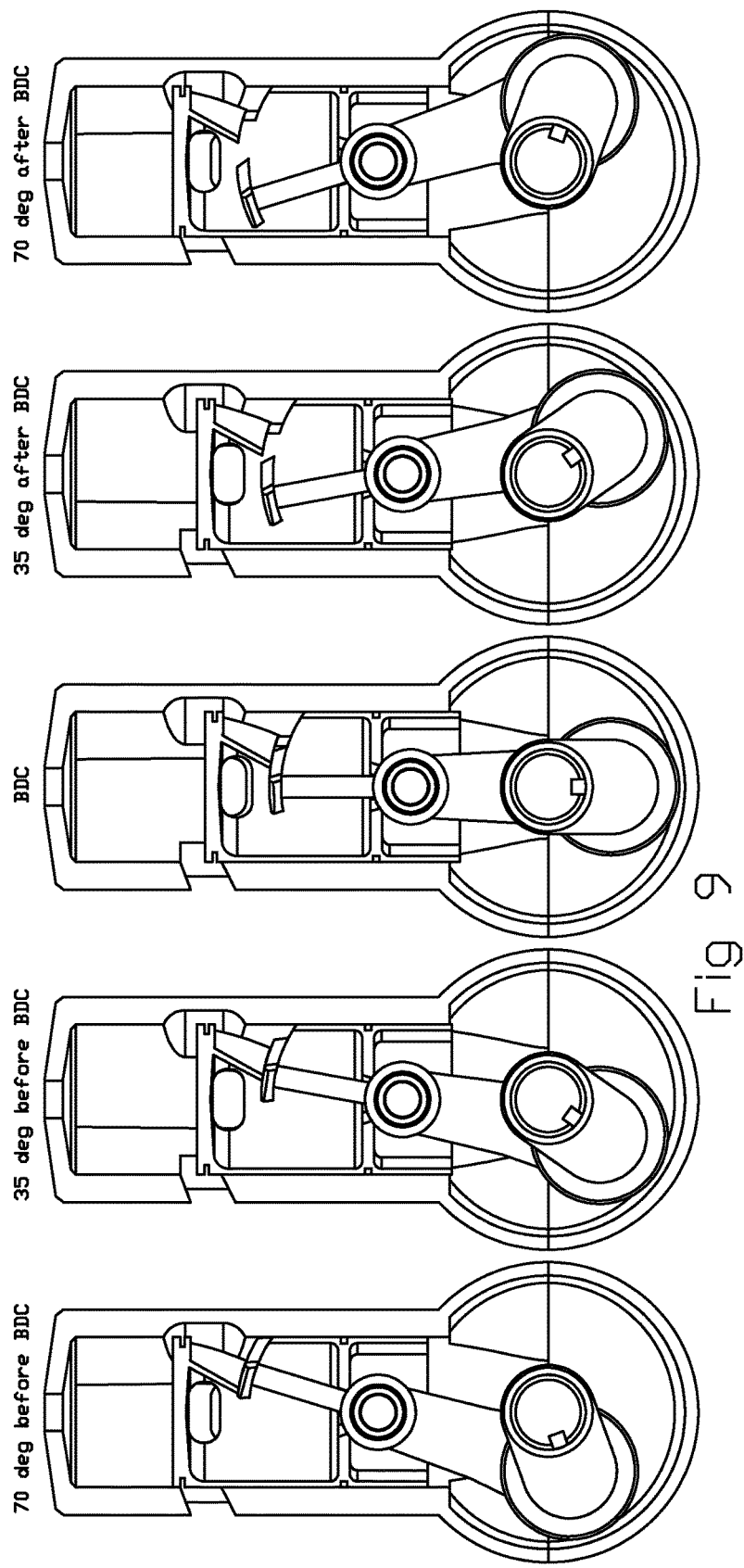
FIG. 9 shows the second embodiment at various crankshaft angles; the parts are shown solid.

FIG. 9 shows what FIG. 8 with the parts shown solid. At left the transfer port has just opened by the piston, while the exhaust port is still closed; the extension of the connecting rod stops the communication of the space within the piston with the transfer port, while the space within the piston starts communicating with an external source (not shown) of pressurized air or mixture. After 35 crankshaft degrees (second from left) the exhaust port is substantially open (the pressure in the combustion chamber has drop) while the transfer control port of the piston is just opening. At the middle the piston is at the BDC, with the exhaust and transfer ports being completely open; the scavenging happens. After another 35 crankshaft degrees (fourth from left) the exhaust port is open, while the space within the piston communicates freely with the transfer port and the combustion chamber through the transfer control ports of the piston. After another 35 crankshaft degrees (at right), the exhaust port is completely closed by the piston, while the source of pressurized air or mixture is still communicating with the combustion chamber through the transfer control port of the piston and through the transfer port, providing a substantially asymmetric timing between the exhaust and the scavenge events. The advantages of keeping isolated the space within the piston from the combustion chamber well after the exhaust port opening are obvious.

Figure 10:
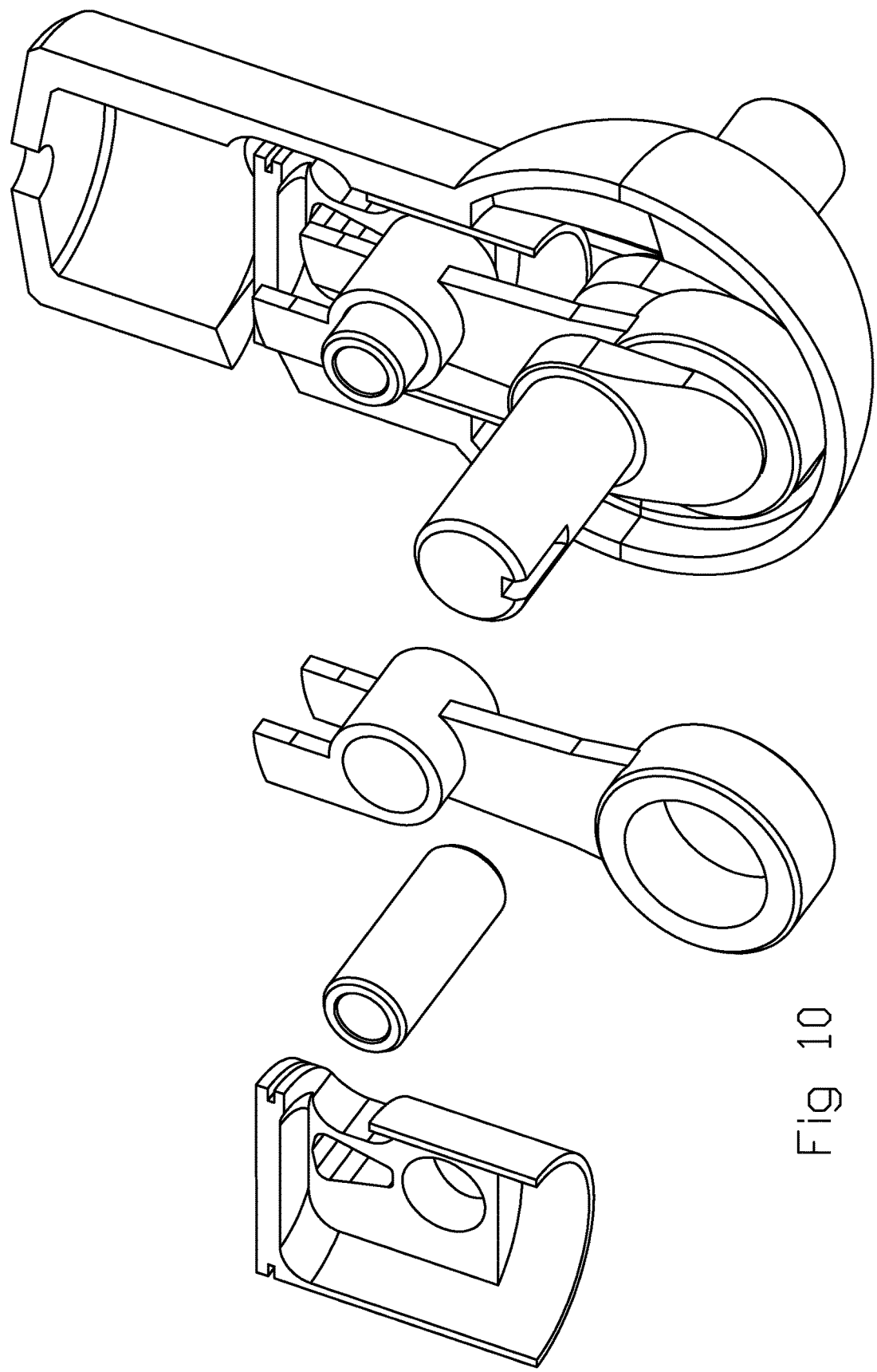
FIG. 10 shows a third embodiment.

FIG. 10 shows a third embodiment.

FIG. 11 shows the third embodiment from another viewpoint.

Figure 12:
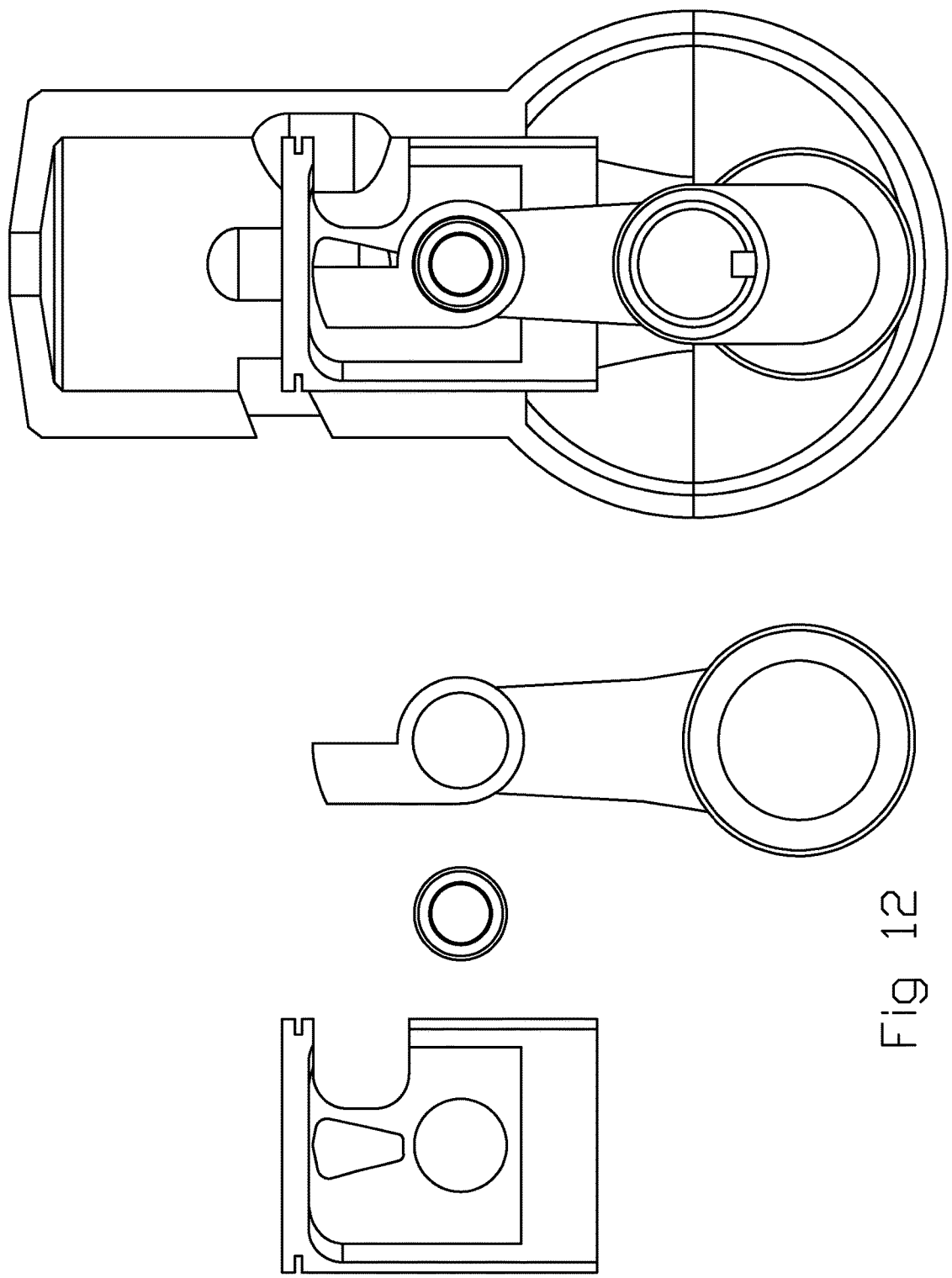
FIG. 12 shows the third embodiment from another viewpoint.

FIG. 12 shows the third embodiment from another viewpoint. It differs from the first embodiment in that there is a second (conventional) transfer port (at right) that opens after the exhaust port and closes before the exhaust port. The space within the piston underneath the piston crown and the space within the crankcase communicate freely through the lower open end of the piston. The crankcase (which is here the source of pressurized air or mixture) communicates with the combustion chamber through different passageways: through a second transfer port passageway (this passageway closes before the exhaust port) and though a transfer control port on the piston (which is controlled by a connecting rod transfer control surface) disposed in series with the transfer port (this passageway closes after the exhaust port). This simple design enables the substantial reduction of the volume of the transfer ports and piston ports wherein the gas being into the combustion chamber "expands" before the opening of the exhaust port, without decreasing the total "transfer port" area: the big part of the fresh charge passes to the combustion chamber through conventional transfer ports, with the transfer control ports of the piston completing the supply of the combustion chamber with fresh charge after the closing of the conventional transfer ports. In this embodiment a pair of flat transfer control surfaces is arranged at the two sides of the connecting rod (one per wrist pin end). No matter what the pressure inside the combustion chamber is when the piston opens the two transfer ports 10 (with the exhaust port 13 still closed), the total force on the connecting rod due to the gas pressure is from small to zero because the force acting on the transfer control surface at one side of the connecting rod counterbalances the force acting on the transfer control surface at the other side of the connecting rod.

Figure 13:
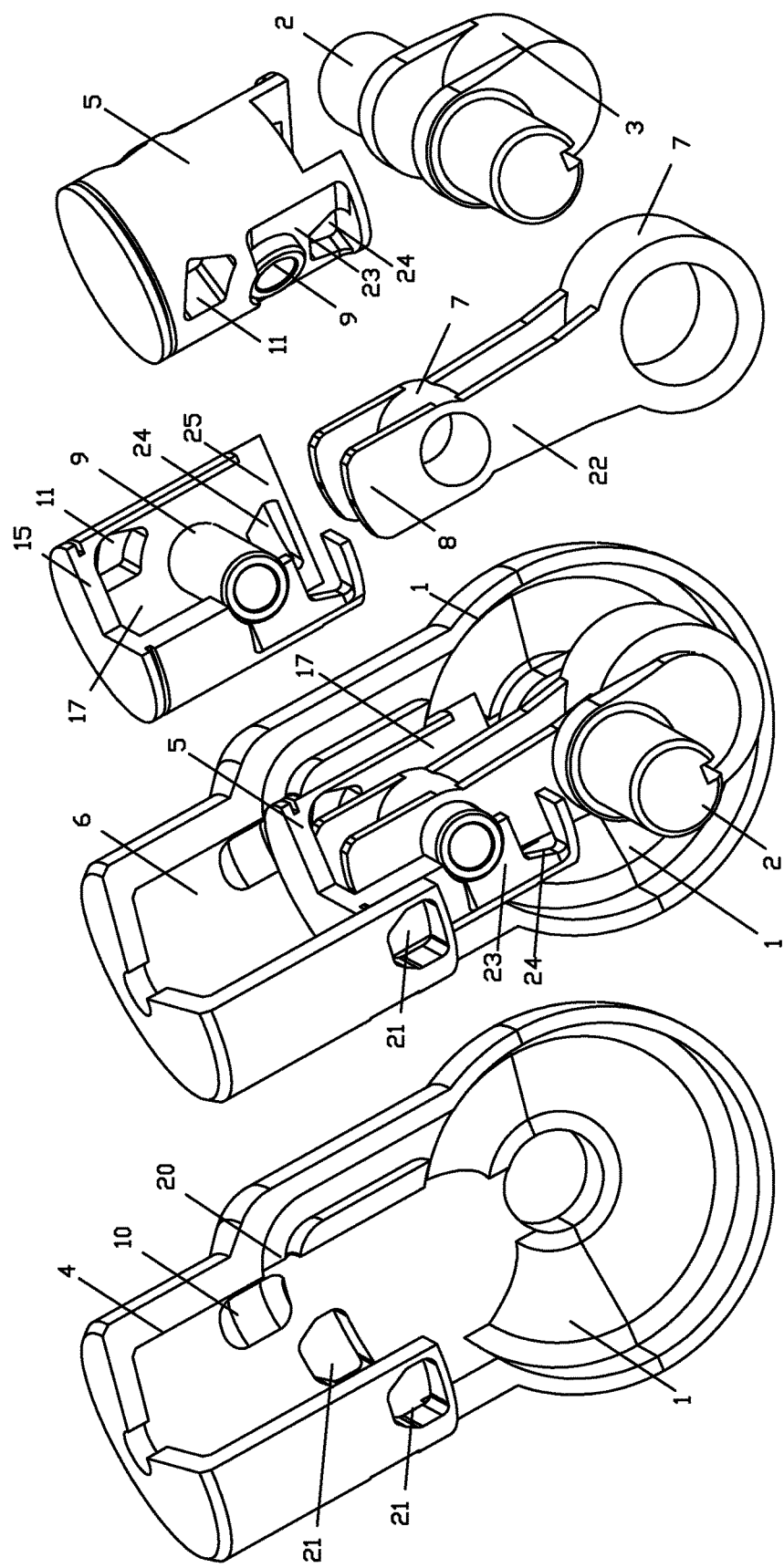
FIG. 13 shows a fourth embodiment, which is the preferred embodiment.

FIG. 13 shows a fourth embodiment (it is the preferred embodiment). It is actually a modified version of the third embodiment wherein the piston in cooperation with the connecting rod and the various ports provides not only asymmetric timing of the transfer process, but also asymmetric timing of the intake. The cylinder comprises intake ports 21. The piston comprises transfer control ports 11 for the control of the transfer, the piston also comprises intake control ports 24 and cuts like 23 for the control, in cooperation with the inlet ports 21, of the intake. The connecting rod comprises intake control surfaces 22 that, in cooperation with mating surfaces 25 of the piston, open and close the intake control ports 24 of the piston.

FIG. 14 shows the fourth embodiment in eight different crank angles (per 45 degrees).

FIG. 15 shows what FIG. 14 with the parts "transparent".

FIG. 16 shows what FIG. 14 with the addition of a "cutview" (section) of the intake port. The numbers of the parts are according the FIG. 13: at the BDC (top left) the inlet port 21 is covered, i.e. it is closed, by the cylindrical external surface of the piston 5, with the intake control port 24 of the piston slightly opened by the intake control surface 22 of the connecting rod 7. 45 crankshaft degrees later the inlet port 21 is still closed by the piston 5, while the intake control port 24 of the piston is open more. 45 crankshaft degrees later the inlet port 21 communicates with the crankcase through the cut/recess 23 and through the intake control port 24 of the piston; the sub-pressure into the crankcase (due to the upwards motion of the piston) causes the suction of air or mixture, through the inlet port 21 and the intake control port 24 of the piston, into the crankcase 1. 45 crankshaft degrees later (top right) the inlet port 21 and the intake control port 24 are wide open, with the crankcase 1 filling with air or mixture that passes through the inlet port 21 and through the intake control port 24. At the TDC (bottom left) the inlet port 21 is wide open, but the intake control port 24 is almost closed by the intake control surface 22 of the connecting rod 7. 45 crankshaft degrees later the intake control port 24 is completely closed by the intake control surface 22 of the connecting rod 7, and the inlet port 21 cannot communicate with the crankcase 1 any longer; with the piston 5 moving downwards, the trapped into the crankcase air or mixture is compressed. 45 crankshaft degrees later the inlet port 21 is almost closed by the piston, while the intake control port 24 is completely closed; the compression of the trapped air or mixture into the crankcase 1 continues. 45 crankshaft degrees later (bottom right) the inlet port 21 and the intake control port 24 are completely closed by the piston 5 and by the connecting rod 7 respectively. According the previous, near the end of the transfer (which typically ends well before the middle stroke) the inlet port 21 starts communicating with the crankcase 1 that suctions progressively, smoothly and efficiently air or mixture; this continues during all the remaining upwards motion of the piston and a (small) part of the downwards motion of the piston after the TDC (i.e. until the intake control surface 22 closes the intake control port 24 and the inlet port 21 stops communicating with the crankcase).

FIG. 17 shows what FIG. 16 with the difference that the inlet port 21 is arranged "lower": around the TDC (bottom left) the inlet port 21 is open "directly" to the crankcase 1, i.e. a part of the air or mixture gets directly into the crankcase without passing through the intake control port 24. This way the advantages of both "schools" (conventional piston controlled intake and asymmetric intake) are combined.

Figure 18:
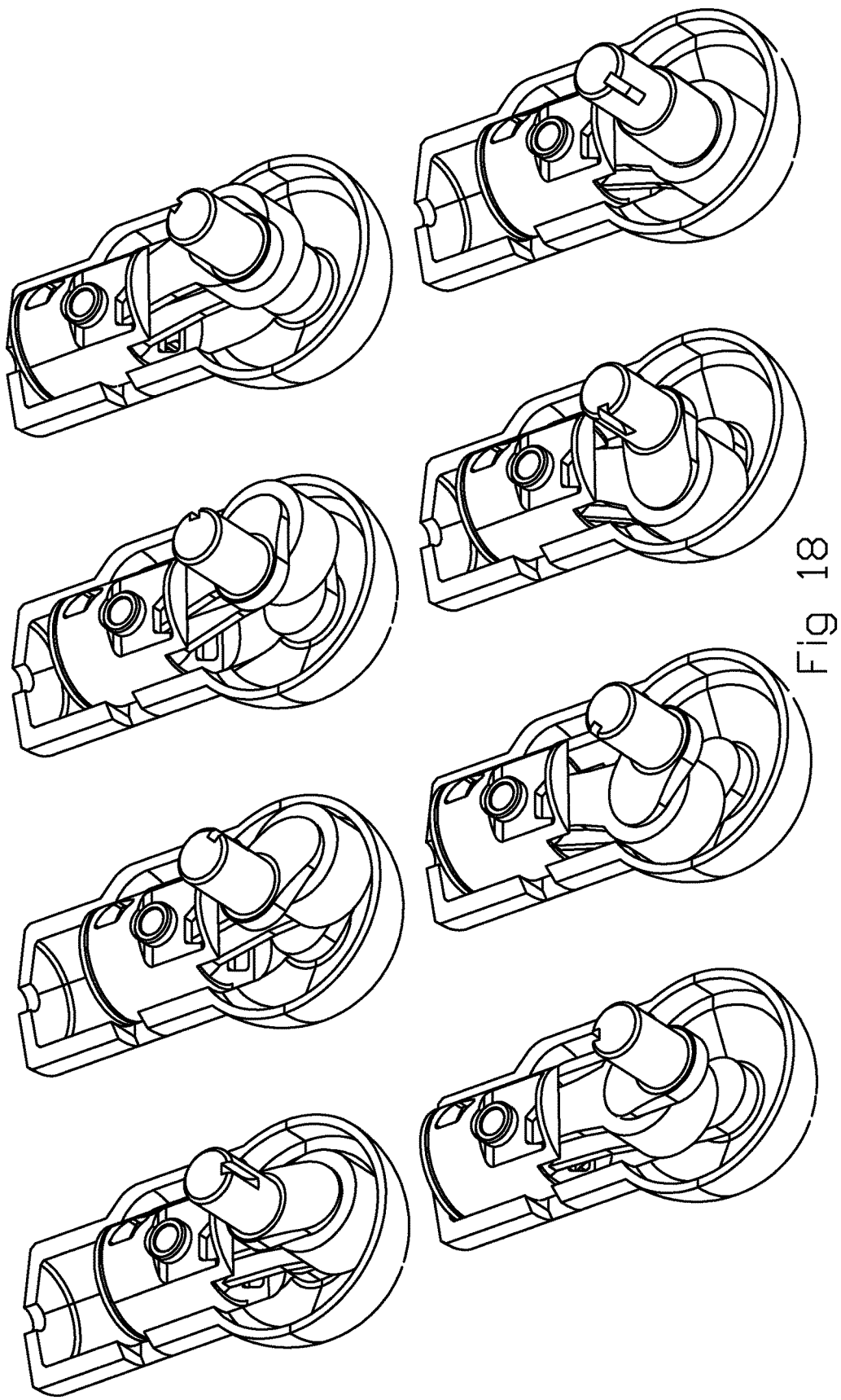
FIG. 18 shows what FIG. 14 from another viewpoint.

FIG. 18 shows what FIG. 14 from another viewpoint.

FIG. 19 shows the exhaust and transfer timing of a typical two stroke. The exhaust opens 65 deg BBDC and closes 65 deg ABDC, while the transfer port opens 45 deg BBDC and closes 45 deg ABDC.

FIG. 20 shows the exhaust and transfer timing of a two stroke made according this invention. In this case the transfer ends 10 deg after the exhaust.

FIG. 21 shows the exhaust and transfer timing of a two stroke made according this invention; in this case the transfer ends 5 deg before the exhaust.

FIG. 22 shows the exhaust and the transfer timing of a two stroke made according this invention; in this case the transfer starts after the closing of the exhaust.

FIG. 23 shows the exhaust, the transfer and the intake timing of a typical two stroke that controls the intake by the piston. The intake opens 60 deg before the TDC and closes 60 deg after the TDC.

FIG. 24 shows the exhaust, the transfer and the intake timing of a two stroke made according the preferred embodiment of this invention. Besides the asymmetric timing of the transfer process (the transfer starts 20 crankshaft degrees after the exhaust and ends 10 degrees after the exhaust), the intake process is also substantially asymmetric: the intake starts communicating with the crankcase 125 crankshaft deg BTDC and stops communicating with the crankcase 40 crankshaft deg ATDC. There is a small overlap of the transfer and of the intake processes (from 55 to 65 deg ABDC). An overlap of the intake with both, the transfer and the exhaust could also be used, for instance by starting the intake 10 degrees earlier.

FIG. 25 shows the exhaust, the transfer and the intake timing of a two stroke made according the fourth embodiment of this invention. In this case, the transfer starts 20 deg after the start of the exhaust and ends 10 deg before the end of exhaust; the intake starts 20 degrees after the end of the exhaust (and 25 degrees after the end of the transfer). The intake ends 15 deg ATDC.

FIG. 26 shows another possible timing scheme of a two-stroke engine made according the fourth embodiment. Here the overlap between the exhaust and transfer is zero. The intake port starts communicating with the crankcase 5 deg after the end of the transfer and ends communicating with the crankcase 30 deg ATDC.

Figure 27:
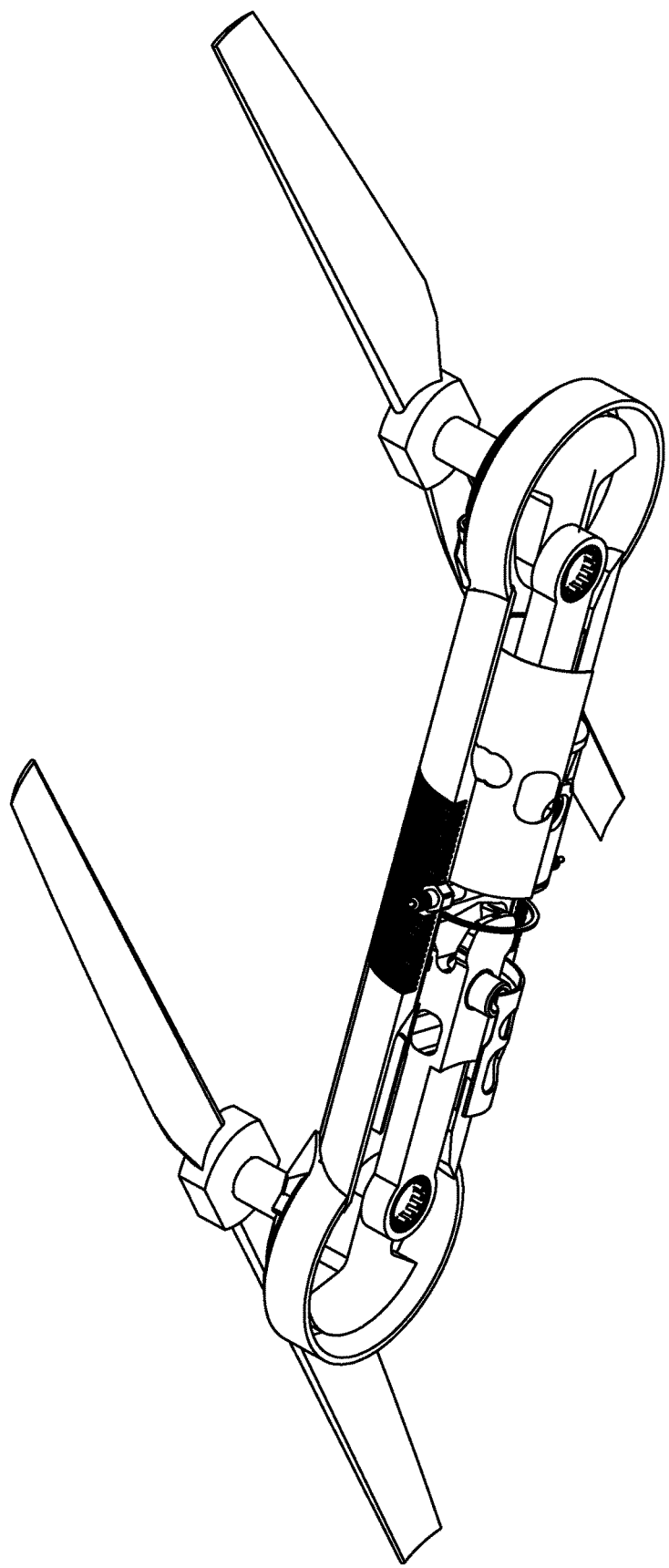
FIG. 27 shows the application of the fourth embodiment on an opposed-piston two stroke.

FIG. 27 shows an application of the fourth embodiment. It is an opposed piston, loop scavenged engine driving two counter rotating propellers. The parts are sliced to show the internal details.

Figure 28:
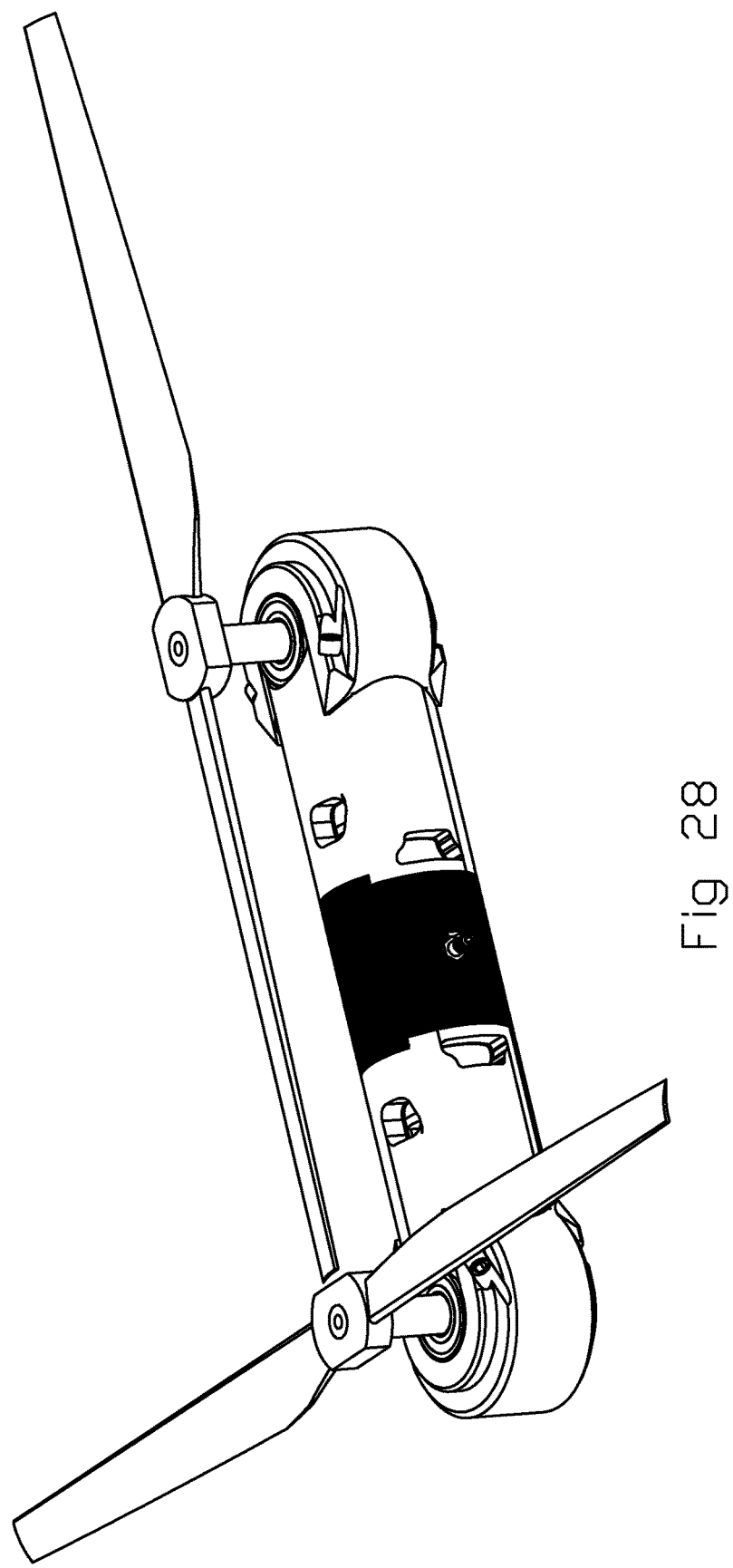
FIG. 28 shows what FIG. 27 from another viewpoint.

FIG. 28 is the engine of FIG. 27 from another viewpoint.

Figure 29:
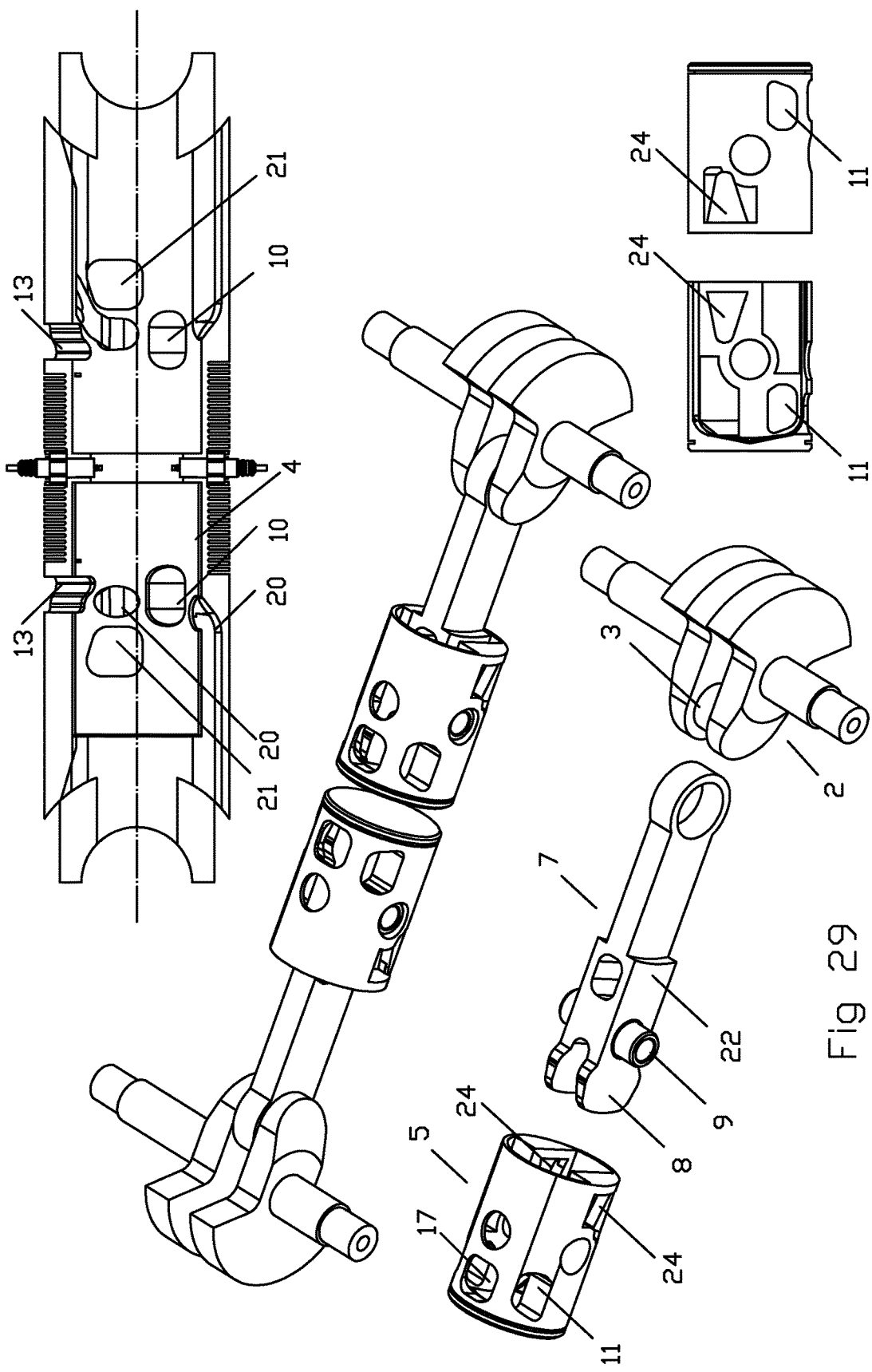
FIG. 29 shows some parts and subassemblies of the opposed piston engine of FIG. 28.

FIG. 29 shows the moving parts of the opposed piston engine of FIG. 28, it also shows the piston sliced (bottom right: intake control port 24, transfer control port 11), it also shows (top right) the casing/cylinder sliced (exhaust ports: 13, conventional "power" and "Schnuerle" transfer ports: 20, asymmetric transfer ports: 10, asymmetric inlet ports: 21, cylinder liner: 4). The proper arrangement of the flat transfer control surfaces 8 at the two sides of the connecting rod, of the transfer control ports 11 at the two sides of the piston, and of the transfer ports 10 at the two sides of the cylinder, liberates the connecting rod from heavy side forces after the opening of the transfer port 10 and before the opening of the exhaust port 13 (i.e. when the pressure inside the combustion chamber 6 and on the transfer control surfaces 8 of the connecting rod 7 is still significant); this way, the sealing between the transfer control surfaces on the connecting rod and the respective flat surfaces on the piston is rid of transferring thrust loads between the cooperating surfaces (which also allows a "touch free" cooperation if desirable).

Two counter-rotating crankshafts share a common compact combustion chamber (the loop scavenging allows a narrowing at the center of the cylinder making the combustion chamber more compact and more efficient without spoiling the scavenging efficiency; another advantage of the narrowing is that, in cooperation with the pistons, it creates two squeeze areas which improve the turbulence and swirl, resulting in faster and cleaner combustion). With zero phase difference between the two crankshafts (which leaves the synchronizing mechanism—not shown—completely unloaded, and enables a lightweight synchronizing mechanism), the transfer and the intake can be as asymmetric as desirable. Thus, the basis of the structure remains perfectly rid of inertia vibrations and of combustion vibrations, and the synchronizing mechanism runs unloaded. These advantages are not achievable with the conventional through-scavenged two-stroke opposed piston engines wherein the asymmetric transfer requires a substantial phase difference between the two crankshafts.

The basis of the structure needs not to provide any reaction torque (not even at extreme changes of revs and load).

With the symmetric counter-rotating propellers (and crankshafts), the total "gyroscopic rigidity" is zero, i.e. the engine/propellers can "instantly" (as instantly as with the propellers stopped) vector the thrust to the desirable direction.

All the above make "a true neutral propulsion unit" for Portable Flyers: neither vibrations, nor reaction torque, nor gyroscopic rigidity; only a force that can "instantly" and effortlessly be vectored towards the desirable direction.

The built-in asymmetric transfer and the built-in asymmetric intake besides improving the fuel efficiency and the clean exhaust, they are also allowing the operation of this two-stroke engine without a tuned exhaust, saving cost and weight.

As aerodynamic "controls" the rider/pilot of the Portable Flyer can use his legs, hands and body, just like the wing-suiters do.

With 1 m diameter propellers and 100 Kp (220 lb) total (including the rider and the fuel) take-off weight, the propeller "disk loading" is only half of the propeller "disk loading" of the Osprey (Bell Boeing V22).

As the Osprey, the Portable Flyer is capable for "vertical take-off/landing (like a helicopter) and for long distance flights at high speed and low fuel consumption (like an airplane).

FIG. 30 shows the Portable Flyer of FIG. 28 on the shoulders of a pilot/rider, at take-off or hovering (at left) and flying at high speed (at right). The synchronizing mechanism between the two crankshafts (not shown) is lightweight because it is rid of loads due to the symmetry of the structure. The propeller secured on a crankshaft, directly consumes the power provided to the crankshaft by the combustion of the fuel; no transmission of power is required. A lightweight casing (not shown; lightweight because it is rid of significant loads) is securing the engine/propellers on the shoulders/body of the pilot/rider.

EMBODIMENTS

According a first embodiment, FIGS. 1 to 5, a reciprocating piston two-stroke engine is comprising at least:
a crankcase 1,
a crankshaft 2, the crankshaft being rotatably mounted in the crankcase 1, the crankshaft having a crankpin 3,
a cylinder 4,
a piston 5 slidably fitted in the cylinder 4,
a combustion chamber 6 defined by the piston 5 and the cylinder 4, the piston 5 is comprising a piston crown 15 separating the combustion chamber 6 from a space 17 within the piston,
a connecting rod 7 rotatably mounted on the crankpin 3 and pivotally mounted, by a wrist pin 9, on the piston 5 so that a rotation of the crankshaft 2 causes a reciprocation of the piston 5 in the cylinder 4 between a top dead center piston position and a bottom dead center piston position,
a transfer control surface 8 on the connecting rod 7;
a transfer port 10 on the cylinder 4;
a transfer control port 11 on the piston 5,
for a portion of a reciprocation of the piston 5 the transfer port 10 is communicating with the combustion chamber 6 while the space 17 within the piston is communicating through the transfer control port 11 with the transfer port 10,
for a portion of a reciprocation of the piston 5 the transfer port 10 is communicating with the combustion chamber 6 while the transfer control surface 8 on the connecting rod 7 is sealing the transfer control port 11 not allowing the communication of the space 17 within the piston, through the transfer control port 11, with the transfer port 10 and the combustion chamber 6,
so that an asymmetric transfer is realized wherein the communication of the combustion chamber 6 with the space 17 within the piston is substantially asymmetrical relative to a displacement of the piston before and after the bottom dead center piston position.

As the connecting rod swings relative to the piston, it opens and closes—by properly formed transfer control surfaces 8 (made preferably at the sides of the connecting rod)—transfer control ports made on the piston allowing and stopping the communication of the transfer port with the crankcase (in this embodiment the space within the piston communicates freely with the crankcase through the open bottom of the piston; in this embodiment the crankcase is the source of pressurized air or mixture for the scavenging).

An adequately small clearance between the connecting rod and the piston ports enables wear-free and friction-free operation without spoiling the sealing.

The shape/geometry of the connecting rod and of the scavenge control ports made on the piston defines the timing of the opening and closing of the scavenge control ports. The transfer ports and the scavenge control ports are disposed "in series" between the combustion chamber and the crankcase; in order the crankcase to communicate with the combustion chamber, both, the transfer ports on the cylinder and the transfer control port on the piston must be open.

As the piston approaches the BDC (Bottom Dead Center), it initially opens the transfer ports, but with the connecting rod closing the transfer control ports of the piston, it is not allowed the communication of the crankcase with the combustion chamber. The gas in the combustion chamber expands slightly in the combined volume of the transfer ports and of the transfer control ports. But the big volume 17 within the piston (or within the piston and within the crankcase) is still sealed from the hot gas of the combustion chamber.

As the piston continues its motion towards the BDC, it opens the exhaust ports and the pressure inside the combustion chamber falls.

As the piston continues its motion the connecting rod opens the transfer control ports of the piston. The combustion chamber communicates, though the transfer ports and the transfer control ports, with the crankcase and the scavenging takes place. The exhaust and the scavenging continue until the exhaust port to be closed by the piston moving towards the TDC (Top Dead Center). The transfer ports and the transfer control ports are still open allowing air or mixture to continue entering into the combustion chamber.

Later the piston closes the transfer ports isolating the combustion chamber from the crankcase, and the compression begins.

In a second embodiment, FIGS. 6 to 9, the source of pressurized air or mixture is not the crankcase (it can be a turbocharger, a piston pump, a roots compressor, an electric turbocharger etc). In this embodiment the crankcase remains isolated from the combustion chamber as in the four-stroke engines, with the piston comprising an oil scraper ring 14 that scraps the surplus of oil from the cylinder liner back to the oil pan. The surface of the cylinder wherein the oil scraper ring slides, is rid of ports. The piston comprises a plate 16 that separates/seals a space 17 within the piston from the crankcase; sealing means (not shown) between the surface of the connecting rod and the plate 16 keep the lubricant inside the crankcase (for instance, an elastic "O" ring in a groove of the lower surface of the plate 16, in touch with the swinging surface of the connecting rod above the wrist pin). The space 17 is disposed between the piston crown 15 and the plate 16. The casing has openings 19, the piston comprises openings 18, through these openings 19, 18 the source of pressurized air or mixture feeds the space 17 within the piston; the space 17 communicates with the combustion chamber through transfer control ports made on the piston and controlled by the connecting rod, and through transfer ports controlled by the piston.

In a third embodiment, FIGS. 10 to 12, there is a second transfer port 20 (at right); the second transfer port 20 opens by the piston 5 after the exhaust port 13, and closes by the piston 5 before the exhaust port 13 (as in the conventional two strokes); the transfer ports 10 communicate with the crankcase (which is here the source of pressurized air or mixture) through the transfer control ports 11 which are controlled by the connecting rod 7; the transfer port 10 closes by the piston 5 after the exhaust port 13.

The piston moving towards the BDC opens the transfer port 10 substantially before the exhaust port 13, but the connecting rod extensions 8 keep the transfer control ports 11 of the piston closed, not allowing the communication of the crankcase with the combustion chamber. After the opening of the exhaust port 13 by the piston (and the drop of the pressure inside the combustion chamber), the connecting rod extensions 8 open the transfer control ports 11 and the combustion chamber communicates with the crankcase; the combustion chamber communicates with the crankcase though the second transfer port 20, too. Later the second transfer port 20 closes by the piston, but the crankcase continues to communicate with the combustion chamber though the transfer ports 10 and the transfer control ports 11, substantially after the closing of the exhaust port 13 by the piston, providing a substantially asymmetric transfer.

In a fourth (and preferred) embodiment, FIGS. 13 to 18 and 27 to 30, the inlet port 21 communicates with the crankcase 1 through intake control ports 24 and piston niches 23. The connecting rod 7, tilting about the wrist pin 9, opens and closes the intake control ports 24, allowing or stopping the communication of the inlet port 21 with the crankcase 1. The inlet port 21 and the intake control port 24 are disposed "in series", i.e. in order air or mixture to get into the crankcase from the intake control port, both ports (the inlet port 21 and the piston port 24) must be open. With the proper design of the piston, of the connecting rod and of the inlet port, heavily asymmetric timing of the intake process can be obtained, as shown in FIGS. 24 to 26. The same piston in cooperation with the same connecting rod can provide asymmetric timing of the transfer, too: all it takes is transfer control ports 11 on the piston in cooperation with transfer control surfaces 8 on the connecting rod 7 and with transfer ports on the cylinder (as explained in the third embodiment).

In a fifth embodiment, a two-stroke engine comprises conventional transfer ports (like 20, FIG. 13) and asymmetric transfer ports (like 10, FIG. 13). There is a throttle valve (not shown) in the conventional transfer port 20; the throttle is, preferably, disposed near the combustion chamber. The arrangement of the transfer control surfaces 8 on the connecting rod, of the transfer control ports 11 on the piston and of the asymmetric transfer ports 10 on the cylinder is such that the crankcase communicates with the combustion chamber through the asymmetric transfer ports 10 only after the closing of the exhaust, as in FIGS. 22 and 26 (alternatively, the communication of the crankcase with the combustion chamber through the asymmetric transfer ports 10 can start before the closing of the exhaust port). In a "green mode" of operation, the throttle valve in the conventional transfer port 20 is closed so that the transfer of the fresh charge from the crankcase to the combustion chamber is realized exclusively through the asymmetric transfer ports 10 reducing or eliminating the overlap between the transfer and the exhaust. In a "power mode" of operation the throttle valve in the conventional transfer port 20 is wide open so that the transfer of the fresh charge from the crankcase to the combustion chamber is realized through both, the conventional transfer ports 20 and the asymmetric transfer ports 10. The more closed the throttle valve in the conventional transfer port 20, the less the actual overlap between the transfer and the exhaust (i.e. between the "green mode" and the "power mode" there are others intermediate modes of operation). The "green mode" fits with partial loads/low-medium revs, the "power mode" fits with heavy load and high revving. The opening of the throttle in the conventional transfer port can be controlled electronically or mechanically (for instance, the throttle valve in the conventional transfer port can be coupled, through a linkage, with the main throttle valve of the engine) etc. While the simplicity and the cost of the engine are similar to those of the conventional two-strokes, the engine becomes environmental friendly and fuel-efficient. The improvement in agricultural tools, scooters, domestic tools etc wherein conventional two-strokes are used, is obvious: green operation without compromise in the power output.

This invention is applicable in most two-stroke engines, spark ignition and compression ignition, small and big, crankcase scavenged and externally scavenged.

Without additional cost or complication, and without significant side effects, the timing of the exhaust and of the intake events becomes quite asymmetric, providing a substantially cleaner exhaust, an increased power and torque output (because more air or mixture is trapped into the combustion chamber) and a better fuel efficiency. It also makes optional the use of a tuned exhaust.

In comparison, the DE1,576,249A1 (which also achieves an asymmetric intake) requires an elastic strip to slide over a port made on the piston, touching the piston; the elastic strip must bend and unbend substantially, once per piston reciprocation. In the present invention the intake control surface is (or behaves as being) integral with the connecting rod: in the simplest case it is a flattening of the external side surfaces of the connecting rod, as in the preferred embodiment, it undergoes neither bending/unbending nor other deformation during operation allowing even the touch-free cooperation of intake control surface and piston (with adequately small clearance). While the pressure difference between the inlet port and the crankcase is low, the pressure inside the combustion chamber at the end of the expansion is significant, making the solution provided by the DE1,576, 249A1 for the asymmetric intake inappropriate for asymmetric transfer.

In comparison to the present invention, the GB2,288,637 and PCT/GB95/02952 (which also achieve an asymmetric transfer) are based on a space within the piston communicating, through ports made on the piston and transfer ports made on the cylinder, with the combustion chamber, the space within the piston is also communicating, through other piston ports which are controlled by the connecting rod, with an inlet port. The opening, by the piston, of the transfer ports before the exhaust ports causes the expansion of the hot (and at significant pressure) gas in the combustion chamber into the space within the piston (ignition of the fresh charge into the piston, piston overheating, contamination of the fresh charge by lots of exhaust gas etc).

In the present invention the transfer control surface of the connecting rod keeps sealed the space within the piston from the combustion chamber substantially after the opening of the transfer (initially) and of the exhaust ports (later).

While in the GB2,288,637 and PCT/GB95/02952 "the matting surfaces" between the connecting rod and the piston are also the "lower bearing of the connecting rod little-end which has not gudgeon pin", in the present invention the connecting rod is pivotally mounted on the piston by a conventional wrist pin, releasing the transfer control surfaces on the connecting rod, and the respective transfer control ports on the piston, from bearing duties. The single piece piston and the easy assembly are other advantages of the present invention, also the fact that the transfer control ports on the piston and the transfer control surfaces on the connecting rod can be arranged closer than the wrist pin to the piston crown, leaving the other side—relative to the wrist pin—of the piston and of the connecting rod free for the intake control.

In the GB2,288,637 and PCT/GB95/02952 the connecting rod has a complex task to accomplish: besides opening and closing some ports on the piston (those connecting the space within the piston with a source of pressurized air or mixture), it also acts as an "auxiliary tilting piston" that seals one side of the "space within the piston" (the volume of which minimizes 90 degrees after the TDC and maximizes 180 degrees later), interfering with the transfer process and worsening the flow efficiency of the "circuit" between the source of pressurized air or mixture and the combustion chamber. Another problem is the long "sealing line" (besides sealing some ports of the piston, the connecting rod has also to seal the one side of the space within the piston) that increases the friction and the gas/lubricant leakage.

In the GB2,288,637 and PCT/GB95/02952 the communication of the space within the piston with transfer ports on the cylinder cannot help being symmetric before and after the BDC, which means that the freer the communication of the space within the piston with the combustion chamber from the closing of the exhaust till the closing of the transfer, the freer the communication of the space within the piston with the combustion chamber from the opening of the transfer till the opening of the exhaust; while the first is highly desirable, the second (i.e. the free communication of the combustion chamber with the space within the piston before the exhaust opening) is a big problem.

According the previous analysis and comparisons, the present invention solves the problem of the "asymmetric transfer and intake in the two-strokes engines" in a simple and reliable way, avoiding the significant side effects of the prior art solutions.

Although the invention has been described and illustrated in detail, the spirit and scope of the present invention are to be limited only by the terms of the appended claims.

The invention claimed is:

1. A reciprocating piston two-stroke engine comprising at least:
   a crankcase (1);
   a crankshaft (2), the crankshaft being rotatably mounted in the crankcase (1), the crankshaft having a crankpin (3);
   a cylinder (4);
   a piston (5) slidably fitted in the cylinder (4);
   a combustion chamber (6) defined by the piston (5) and the cylinder (4), the piston (5) is comprising a piston crown (15) separating the combustion chamber (6) from a space (17) within the piston;
   a connecting rod (7) rotatably mounted on the crankpin (3) and pivotally mounted, by a wrist pin (9), on the piston (5) so that a rotation of the crankshaft (2) causes a reciprocation of the piston (5) in the cylinder (4) between a top dead center piston position and a bottom dead center piston position;
   a transfer control surface (8) on the connecting rod (7);
   a transfer port (10) on the cylinder (4);
   a transfer control port (11) on the piston (5),
   for a portion of a reciprocation of the piston (5) the transfer port (10) is communicating with the combustion chamber (6) while the space (17) within the piston is communicating through the transfer control port (11) with the transfer port (10),
   for a portion of a reciprocation of the piston (5) the transfer port (10) is communicating with the combustion chamber (6) while the transfer control surface (8) on the connecting rod (7) is sealing the transfer control port (11) not allowing the communication of the space (17) within the piston, through the transfer control port (11), with the transfer port (10) and the combustion chamber (6),
   so that an asymmetric transfer is realized wherein the communication of the combustion chamber (6) with the space (17) within the piston is substantially asymmetrical relative to a displacement of the piston before and after the bottom dead center piston position.

2. A reciprocating piston two-stroke engine according claim 1, further comprising:
   an intake control surface (22) on the connecting rod (7);
   an inlet port (21) on the cylinder (4);
   an intake control port (24) on the piston (5),
   for a portion of a reciprocation of the piston (5) the crankcase (1) is communicating, through the intake control port (24), with the inlet port (21),
   for a portion of a reciprocation of the piston (5) the intake control surface (22) on the connecting rod (7) is sealing the intake control port (24) not allowing the communication, through the intake control port (24), of the inlet port (21) with the crankcase (1),
   so that an asymmetric intake is realized wherein the communication of the crankcase (1) with the inlet port (21) is substantially asymmetrical relative to a displacement of the piston before and after the top dead center piston position.

3. A reciprocating piston two-stroke engine according claim 1, wherein the transfer control surface (8) is integral with, or secured to, the connecting rod (7).

4. A reciprocating piston two-stroke engine according claim 1, wherein the space (17) within the piston is sealed from the crankcase, and wherein the piston is comprising an oil scraper ring (14) scraping a surplus of oil from the cylinder back to an oil pan for recirculation, and wherein an external source of pressurized air of mixture is used for the scavenging.

5. A reciprocating piston two-stroke engine according claim 1, wherein the space (17) within the piston is communicating freely with the crankcase.

6. A reciprocating piston two-stroke engine according claim 1, further comprising an exhaust port (13) controlled by the piston (5),
wherein the transfer control surface (8), the transfer control port (11) and the transfer port (10) are arranged so that the communication of the combustion chamber (6) with the space (17) within the piston starts after the closing of the exhaust port (13) by the piston (5), eliminating an overlap between exhaust and scavenging.

7. A reciprocating piston two-stroke engine according claim 1, wherein the transfer control surface (8) is a flat surface on a plane substantially normal to an axis of the wrist pin (9).

8. A reciprocating piston two-stroke engine according claim 1, wherein the connecting rod comprises transfer control surfaces (8) at two opposite sides, each towards an end of the wrist pin (9),
so that the force caused on one side of the connecting rod due to the pressure in the combustion chamber counterbalances a substantial part of the force caused on the opposite side of the connecting rod due to the pressure in the combustion chamber.

9. A reciprocating piston two-stroke engine according claim 1, further comprising a separating plate (16),
the space (17) within the piston is defined between the piston crown (15) and the separating plate (16),
the space (17) within the piston is sealed from the crankcase and is communicating with an external source of pressurized air or mixture through inlets ports (19) made on the cylinder (4) and openings (18) made on the piston (5).

10. A reciprocating piston two-stroke engine as in claim 1, further comprising an exhaust port (13) controlled by the piston (5); a second transfer port (20) controlled by the piston (5),
the piston (5) opens the exhaust port (13) before the second transfer port (20), the piston (5) closes the second transfer port (20) before the exhaust port (13), the piston (5) closes the exhaust port (13) before the transfer port (10).

11. A reciprocating piston two-stroke engine as in claim 1, further comprising an exhaust port (13) controlled by the piston (5), a second transfer port (20) controlled by the piston (5) and a throttle valve inside the second transfer port (20),
the piston (5) opens the exhaust port (13) before the second transfer port (20), the piston (5) closes the second transfer port (20) before the exhaust port (13), so that:
when the throttle valve is closed, the crankcase (1) is not allowed to communicate with the combustion chamber (6) through the second transfer port 20, reducing or eliminating the overlap between transfer and exhaust,
and when the throttle valve is open, the crankcase (1) communicates with the combustion chamber (6) through both, the second transfer port (20) and the transfer port (10), increasing a flow efficiency and a power output of the engine.

12. A reciprocating piston two-stroke engine according claim 1, wherein the transfer control port (11) is disposed closer than the wrist pin (9) to the piston crown (15), reducing the required volume and length of the transfer port (10).

13. A reciprocating piston two-stroke engine according claim 1, wherein the transfer control surface (8) is arranged closer than the wrist pin (9) to the piston crown (15), releasing the part of the connecting rod between the wrist pin (9) and the crankpin (3) for the control of the intake.

14. A reciprocating piston two-stroke engine comprising at least:
a crankcase (1);
a crankshaft (2), the crankshaft being rotatably mounted in the crankcase (1), the crankshaft having a crankpin (3);
a cylinder (4);
a piston (5) slidably fitted in the cylinder (4);
a combustion chamber (6) defined by the piston (5) and the cylinder (4);
a connecting rod (7) rotatably mounted on the crankpin (3) and pivotally mounted, by a wrist pin (9), on the piston (5) so that a rotation of the crankshaft (2) causes a reciprocation of the piston (5) in the cylinder (4) between a top dead center piston position and a bottom dead center piston position;
an intake control surface (22) on the connecting rod (7);
an inlet port (21) on the cylinder (4);
an intake control port (24) on the piston (5),
for a portion of a reciprocation of the piston (5) the crankcase (1) is communicating, through the intake control port (24), with the inlet port (21),
for a portion of a reciprocation of the piston (5) the intake control surface (22) on the connecting rod (7) is sealing the intake control port (24) not allowing the communication of the crankcase (1) with the inlet port (21) through the intake control port (24),
so that an asymmetric intake is realized wherein the communication of the crankcase (1) with the inlet port (21) is substantially asymmetrical relative to a displacement of the piston before and after the top dead center piston position.

15. A reciprocating piston two-stroke engine according claim 14, wherein the distance of the piston from the top dead center piston position when the inlet port starts communicating with the crankcase is substantially bigger than the distance of the piston from the top dead center piston position when the inlet port stops communicating with the crankcase.

16. A reciprocating piston two-stroke engine according claim 14, wherein for a portion of a reciprocation of the piston (5) the crankcase (1) is communicating directly with the inlet port (21) so that air or mixture can enter from the inlet port (21) into the crankcase without first passing though the intake control port (24).

17. A reciprocating piston two-stroke engine according claim 14, wherein the intake control surface (22) is integral with, or secured to, the connecting rod (7).

18. A reciprocating piston two-stroke engine according claim 14, further comprising a second inlet port on the cylinder, the second inlet port is controlled by the piston, the communication of the second inlet port with the crankcase is symmetrical relative to a displacement of the piston before and after the top dead center piston position.

19. A reciprocating piston two-stroke engine according claim 2, wherein the transfer control surface (8) and the intake control surface (22) are disposed on the connecting rod at opposite sides of the wrist pin (9).

\* \* \* \* \*